US011228919B2

(12) United States Patent
Jeon et al.

(10) Patent No.: US 11,228,919 B2
(45) Date of Patent: Jan. 18, 2022

(54) NETWORK SYNCHRONIZATION FOR SHARED SPECTRUM SYSTEMS

(71) Applicant: Samsung Electronics Co., Ltd., Suwon-si (KR)

(72) Inventors: Jeongho Jeon, San Jose, CA (US); Russell Ford, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/946,992

(22) Filed: Jul. 14, 2020

(65) Prior Publication Data

US 2021/0022008 A1    Jan. 21, 2021

Related U.S. Application Data

(60) Provisional application No. 62/874,273, filed on Jul. 15, 2019.

(51) Int. Cl.
*H04W 16/14* (2009.01)
*H04W 24/10* (2009.01)
(Continued)

(52) U.S. Cl.
CPC ........... *H04W 16/14* (2013.01); *H04W 24/10* (2013.01); *H04W 56/0015* (2013.01); *H04W 84/18* (2013.01)

(58) Field of Classification Search
CPC . H04W 16/14; H04W 24/10; H04W 56/0015; H04W 84/18; H04W 88/08; H04W 16/10
See application file for complete search history.

(56) References Cited

U.S. PATENT DOCUMENTS

2008/0240072 A1\* 10/2008 Bykovnikov ......... H04W 88/08
370/350
2014/0334399 A1   11/2014 Xu et al.
(Continued)

OTHER PUBLICATIONS

International Search Report and Written Opinion of the International Searching Authority in connection with International Patent Application No. PCT/KR2020/009346 dated Oct. 21, 2020, 12 pages.

(Continued)

*Primary Examiner* — Chuong A Ngo

(57) ABSTRACT

An electronic device, a method, and a BS for managing a BSs in a shared spectrum. The electronic device receives synchronization measurement reports (SMRs) from the BSs and identifies, based on the SMRs, at least one synchronization source BS and at least one slave BS from the BSs. Transmission timing of the at least one slave BS is based on transmission timing of the at least one synchronization source BS. The electronic device assigns the at least one synchronization source BS to a stratum in a synchronization hierarchy. A synchronization source BS assigned to an n=0 stratum provides a reference frame timing for the plurality of BSs and a synchronization source BS assigned to an n>0 stratum derives frame timing from another synchronization source BS assigned to an n−1 stratum. The electronic device configures synchronization signals and transmits synchronization management indications (SMIs) to the plurality of BSs.

20 Claims, 31 Drawing Sheets

(51) Int. Cl.
*H04W 56/00* (2009.01)
*H04W 84/18* (2009.01)

(56) References Cited

U.S. PATENT DOCUMENTS

2015/0148053 A1* 5/2015 Patel ................ H04W 72/0426
  455/452.1
2016/0157197 A1* 6/2016 Takeda ................ H04W 16/32
  370/350
2016/0183206 A1 6/2016 Centonza et al.

OTHER PUBLICATIONS

"LTE; Evolved Universal Terrestrial Radio Access (E-UTRA); TDD Home eNode B (HeNB) Radio Frequency (RF) requirements analysis (3GPP TR 36.922 version 15.0.0 Release 15)", ETSI TR 136 922 V15.0.0, Jul. 2018, 74 pages.

Federal Communications Commission, "Report and Order and Further Notice of Proposed Rulemaking", FCC 16-89, Jul. 14, 2016, 278 pages.

Federal Communications Commission, "Order on Reconsideration and Second Report and Order", FCC 16-55, May 2, 2016, 123 pages.

Paul et al., "Understanding Traffic Dynamics in Cellular Data Networks", Proceedings—IEEE INFOCOM, Apr. 2011, 9 pages.

"5 GHz RLAN; Harmonised Standard covering the essential requirements of article 3.2 of Directive 2014/53/EU", ETSI EN 301 893 V2.0.7, Nov. 2016, 123 pages.

Xu et al., Understanding Mobile Traffic Patterns of Large Scale Cellular Towers in Urban Environment, IEEE/ACM Transactions on Networking, vol. 25, No. 2, Apr. 2017, pp. 1147-1161.

* cited by examiner

NETWORK SYNCHRONIZATION FOR SHARED SPECTRUM SYSTEMS

CROSS-REFERENCE TO RELATED APPLICATION AND CLAIM OF PRIORITY

This application claims priority under 35 U.S.C. § 119(e) to U.S. Provisional Patent Application No. 62/874,273 filed on Jul. 15, 2019. The above-identified provisional patent application is hereby incorporated by reference in its entirety.

TECHNICAL FIELD

The present disclosure relates generally to wireless communication systems, and more specifically, synchronization of wireless base stations for facilitating inter-base station communication in coordinated shared spectrum networks.

BACKGROUND

A communication system includes a downlink (DL) that conveys signals from transmission points, such as base stations (BSs), to reception points, such as user equipments (UEs). The communication system also includes an uplink (UL) that conveys signals from transmission points, such as UEs, to reception points, such as BSs.

Increasing the deployment density of BSs is a way to increase data throughput, via spatial reuse of frequencies. In fact, such spatial reuse has been one of the main contributors for increase in system throughput since the early days of cellular communication. While improving spatial reuse, a dense BS deployment may be inevitable at millimeter wave (mm-wave) and terahertz (THz) frequencies to improve coverage, by compensating for the pathloss and blockage.

Another way of increasing data throughput involves the opening of unlicensed or shared spectrums. For example, in the United States, 3.55-3.7 GHz Citizens Broadband Radio Service (CBRS) band has a unique three-tiered, hierarchical access model that includes incumbent access (e.g., Federal user, Fixed Satellite Service), priority access licensees (PALs), and general authorized access (GAA) in descending priority. In another example, 5925-7125 MHz band has been recently approved by FCC for unlicensed use in the U.S. 5925-6425 MHz band are under consideration in the E.U. and the regulation is expected to be finished in a near future. In yet another example, 37-38.6 GHz band is expected to be opened. When FCC published the rules for spectrum frontiers (5G), it was suggested that the band could be shared between commercial systems and "future" federal systems. The sharing framework is expected to be distinguished from general unlicensed spectrum. Another example is the extension of the 60 GHz band to 57-71 GHz for unlicensed use. Opening more unlicensed or shared spectrums can be seen as a global trend.

SUMMARY

Embodiments of the present disclosure include an electronic device and corresponding method for managing a shared spectrum, and a base station (BS) for operating in the shared spectrum. One embodiment is directed to an electronic device that includes a memory comprising instructions for managing the shared spectrum and a processor operably connected to the memory and configured to execute the instructions to cause the electronic device to receive synchronization measurement reports (SMRs) from the plurality of BSs and identify, based on the SMRs, at least one synchronization source BS and at least one slave BS from the plurality of BSs. Transmission timing of the at least one slave BS is based on transmission timing of the at least one synchronization source BS. The electronic device assigns the at least one synchronization source BS to a stratum in a synchronization hierarchy. A synchronization source BS assigned to an n=0 stratum provides a reference frame timing for the plurality of BSs and a synchronization source BS assigned to an n>0 stratum derives frame timing from another synchronization source BS assigned to an n−1 stratum. The electronic device configures synchronization signals and transmits synchronization management indications (SMIs) to the plurality of BSs. The SMIs include (i) the configured synchronization signals, (ii) the assigned stratum, and (iii) synchronization source/slave assignments.

Another embodiment is directed to a method for managing a shared spectrum among a plurality of BSs. The method includes receiving synchronization measurement reports (SMRs) from the plurality of BSs and identifying, based on the SMRs, at least one synchronization source BS and at least one slave BS from the plurality of BSs. Transmission timing of the at least one slave BS is based on transmission timing of the at least one synchronization source BS. The method also includes assigning the at least one synchronization source BS to a stratum in a synchronization hierarchy. A synchronization source BS assigned to an n=0 stratum provides a reference frame timing for the plurality of BSs and a synchronization source BS assigned to an n>0 stratum derives frame timing from another synchronization source BS assigned to an n−1 stratum. The method also includes configuring synchronization signals and transmitting synchronization management indications (SMIs) to the plurality of BSs. The SMIs include (i) the configured synchronization signals, (ii) the assigned stratum, and (iii) synchronization source/slave assignments.

Yet another embodiment is directed to a base station operating in a shared spectrum. The BS includes a processor configured to generate a synchronization measurement report (SMR) and a transceiver operably connected to the processor, the transceiver configured to transmit the SMR and receive a synchronization management indications (SMI). The SMI includes at least one of (i) configured synchronization signals, (ii) an assigned stratum n, or (iii) synchronization source/slave assignments. Responsive to the transceiver receiving the assigned stratum n, transmit a set of over-the-air synchronization signals (OSS) to at least one of another synchronization source BS assigned to an n+1 stratum in the synchronization hierarchy or at least one slave BS. If the BS is assigned to an n=0 stratum, the BS transmits the set of OSS without reference to frame timing from another synchronization source BS, and if the BS is assigned to an n>0 stratum, the BS transmits the set of OSS based on frame timing derived from another synchronization source BS assigned to an n−1 stratum.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
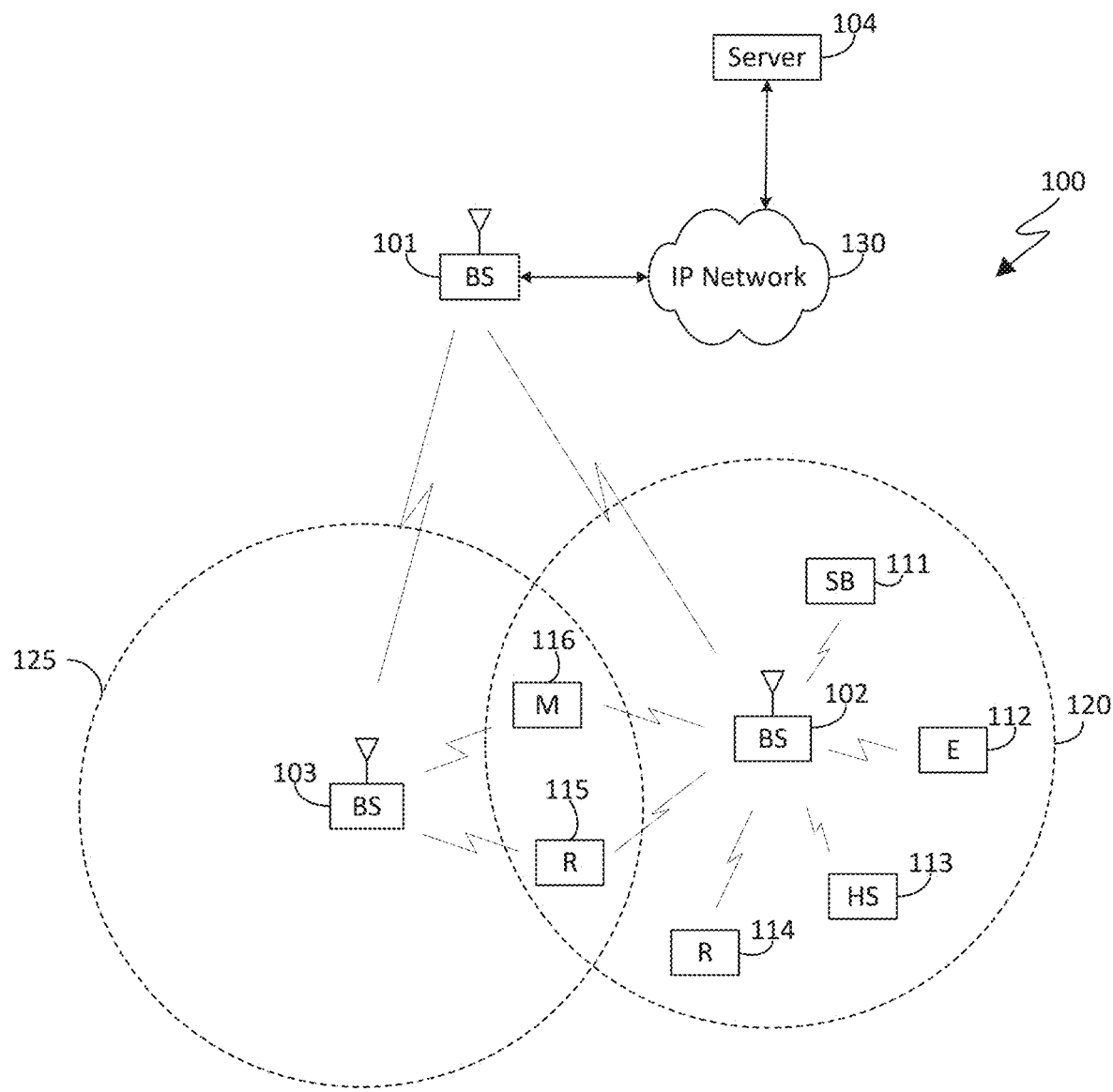
FIG. 1 illustrates an exemplary networked computing system according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

Spectrum utilizations fluctuate temporally and geographically. Sharing the spectrum via multiplexing between different entities will enable more efficient utilization of the spectrum, whether it is unlicensed or shared spectrum. As used herein, the term "shared spectrum" is used in an inclusive manner without the distinction between the shared spectrum and unlicensed spectrum and it also includes not only the currently available spectrums but also spectrums that will be made available in the future.

In existing unlicensed spectrums, e.g., 2.4 GHz, 5 GHz, channel access is based on random access, i.e., carrier sense multiple access/collision avoidance (CSMA/CA). It is known that CSMA/CA with exponential backoff lowers the airtime utilization efficiency when the network densifies. Sharing is non-cooperative as it is based on regulations set by regulatory bodies and controlled by fixed rules. Fundamentally, there is no guarantee of spectrum access. Therefore, it may be disadvantageous for operators to use these unlicensed spectrums to deploy infrastructure systems for providing paid services to mobile subscribers, since the reliability and accessibility of the service cannot be guaranteed.

The embodiments disclosed herein relate to methods and related signaling for time synchronization between wireless base stations in a shared spectrum network. Two broad embodiments are proposed: inter-base station synchronization and synchronization by dedicated synchronization sources. As used herein, "sync sources", "master BS", "master node", "source base station", and "synchronization source BS" may be used interchangeably.

With inter-base station synchronization, timing synchronization is achieved by transmission of wireless signals by a set of synchronization source base stations and reception of the signals by other base stations. Various embodiments describe a method and related signaling for establishing a hierarchy of master/slave relationships between master synchronization sources, which transmit synchronization signals, and slave base stations, which listen for synchronization signals from one or more synchronization sources and use them to synchronize with the shared spectrum network. Various embodiments also describe a method and related signaling for centralized, as well as distributed, determination of the master/slave relationships. Additional embodiments describe a method for re-synchronization of User Equipment (UE) that are attached to a base station when the serving base station changes its coarse timing, along with related signaling.

Dedicated synchronization sources provide a system of dedicated radio nodes, which have the primary purpose of transmitting over-the-air (OTA) synchronization signals (OSS) for facilitating synchronization by many base stations over a large geographic area.

Novel aspects of this disclosure recognize the problem of inter-base station timing synchronization for shared spectrum systems. Time synchronization between base stations allows for control signals to be received by other base stations at the expected time offsets. Also, in the scenario where base stations are assigned to different time slots in a TDMA scheme for interference coordination in shared spectrum networks, time synchronization ensures the proper timing of transmissions to be within the appropriate slots.

FIG. 1 illustrates an exemplary networked computing system according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an gNodeB (gNB) 101, an gNB 102, and an gNB 103. The gNB 101 communicates with the gNB 102 and the gNB 103. The gNB 101 also communicates with at least one Internet Protocol (IP) network 130, such as the Internet, a proprietary IP network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, other well-known terms may be used instead of "gNodeB" or "gNB," such as "base station" or "access point." For the sake of convenience, the terms "gNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, BSs in a networked computing system can be managed to allow spectrum sharing based on interference relationships between BSs. In some embodiments, a shared spectrum manager (SSM) in the networked computing system can provide a centralized resource coordination and assignment scheme by providing synchronization source/slave assignments and configured synchronization signals.

Although FIG. 1 illustrates one example of a wireless network 100, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2:
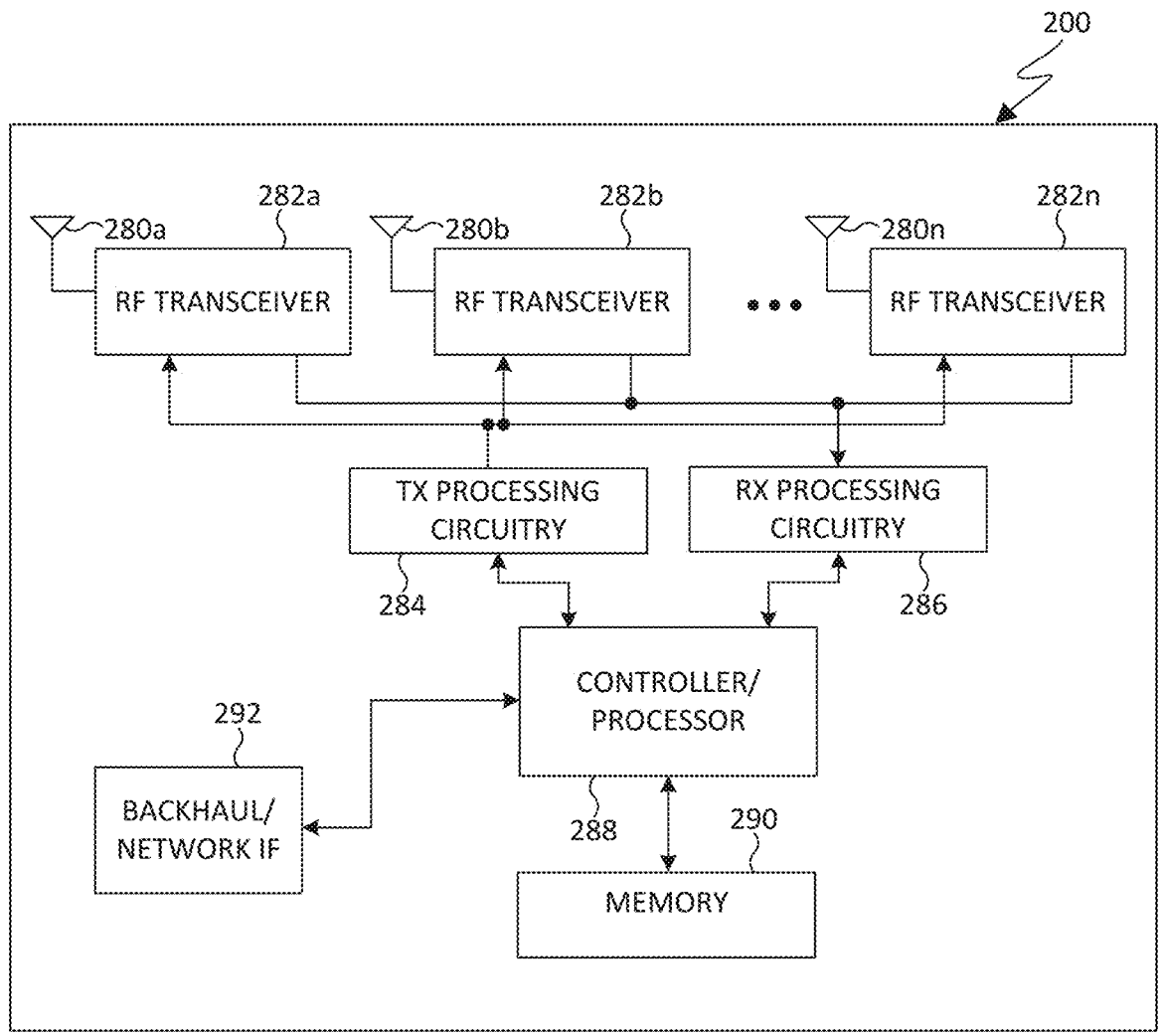
FIG. 2 illustrates an exemplary base station (BS) in the networked computing system according to various embodiments of this disclosure.

FIG. 2 illustrates an exemplary base station (BS) according to various embodiments of this disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of an gNB.

As shown in FIG. 2, the gNB 102 includes multiple antennas 280a-280n, multiple RF transceivers 282a-282n, transmit (TX) processing circuitry 284, and receive (RX) processing circuitry 286. The gNB 102 also includes a controller/processor 288, a memory 290, and a backhaul or network interface 292.

The RF transceivers 282a-282n receive, from the antennas 280a-280n, incoming RF signals, such as signals transmitted by UEs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the gNB 102. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the gNB 102 by the controller/processor 288. In some embodiments, the controller/processor 288 includes at least one microprocessor or microcontroller.

The controller/processor 288 is also capable of executing programs and other processes resident in the memory 290, such as a basic OS. The controller/processor 288 can move data into or out of the memory 290 as required by an executing process.

The controller/processor 288 is also coupled to the backhaul or network interface 292. The backhaul or network interface 292 allows the gNB 102 to communicate with other devices or systems over a backhaul connection or over a network. The interface 292 could support communications over any suitable wired or wireless connection(s). For example, when the gNB 102 is implemented as part of a cellular communication system (such as one supporting 5G, LTE, or LTE-A), the interface 292 could allow the gNB 102 to communicate with other gNBs over a wired or wireless backhaul connection. When the gNB 102 is implemented as an access point, the interface 292 could allow the gNB 102 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

As described in more detail below, base stations in a networked computing system can be assigned as synchronization source BS or a slave BS based on interference relationships with other neighboring BSs. In some embodiments, the assignment can be provided by a shared spectrum manager. In other embodiments, the assignment can be agreed upon by the BSs in the networked computing system. Synchronization source BSs transmit OSS to slave BSs for establishing transmission timing of the slave BSs.

Although FIG. 2 illustrates one example of gNB 102, various changes may be made to FIG. 2. For example, the gNB 102 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the gNB 102 could include multiple instances of each (such as one per RF transceiver). Also, various components in FIG. 2 could be combined, further subdivided, or omitted and additional components could be added according to particular needs.

Figure 3:
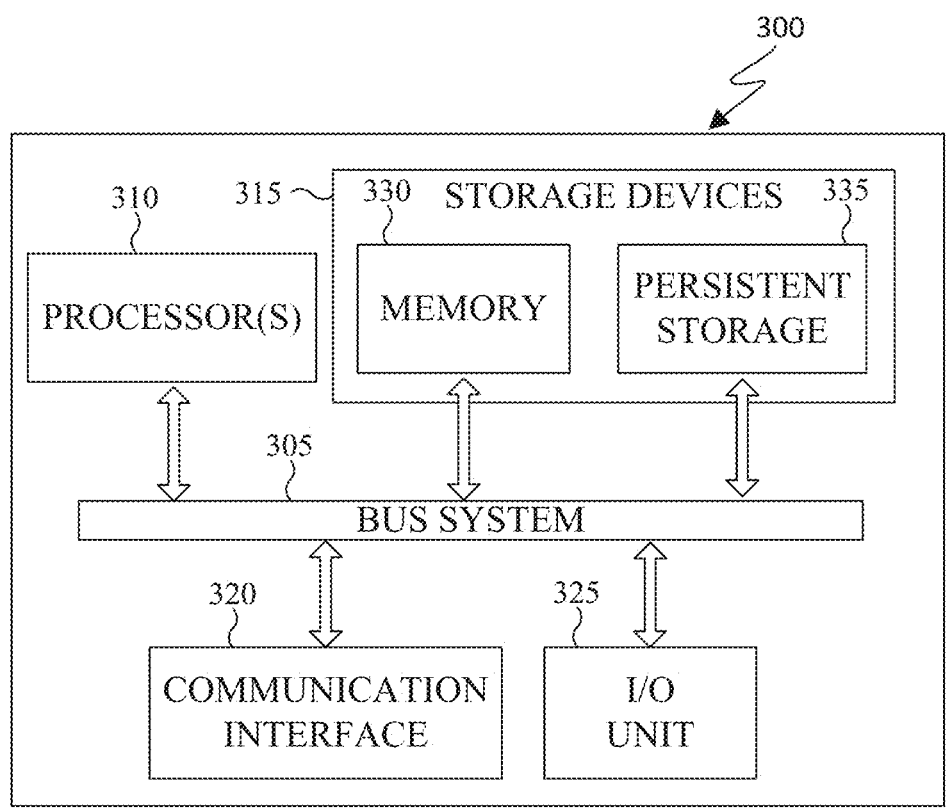
FIG. 3 illustrates an exemplary electronic device for managing a shared spectrum in the networked computing system according to various embodiments of this disclosure.

FIG. 3 illustrates an exemplary electronic device 300 for managing a shared spectrum in the networked computing system according to various embodiments of this disclosure. In one embodiment, the electronic device is a shared spectrum manager implemented as a server, which can represent server 104 in FIG. 1.

As shown in FIG. 3, the electronic device 300 includes a bus system 305, which supports communication between at least one processing device 310, at least one storage device 315, at least one communications unit 320, and at least one input/output (I/O) unit 325.

The processing device 310 executes instructions that may be loaded into a memory 330. The processing device 310 may include any suitable number(s) and type(s) of processors or other devices in any suitable arrangement. Example types of processing devices 310 include microprocessors, microcontrollers, digital signal processors, field programmable gate arrays, application specific integrated circuits, and discreet circuitry.

The memory 330 and a persistent storage 335 are examples of storage devices 315, which represent any structure(s) capable of storing and facilitating retrieval of information (such as data, program code, and/or other suitable information on a temporary or permanent basis). The memory 330 may represent a random access memory or any other suitable volatile or non-volatile storage device(s). The persistent storage 335 may contain one or more components or devices supporting longer-term storage of data, such as a ready only memory, hard drive, Flash memory, or optical disc.

The communications unit 320 supports communications with other systems or devices. For example, the communications unit 320 could include a network interface card or a wireless transceiver facilitating communications over the network 130. The communications unit 320 may support communications through any suitable physical or wireless communication link(s).

The I/O unit 325 allows for input and output of data. For example, the I/O unit 325 may provide a connection for user input through a keyboard, mouse, keypad, touchscreen, or other suitable input device. The I/O unit 325 may also send output to a display, printer, or other suitable output device.

As described in more detail below, the electronic device 300 can serve as a shared spectrum manager in a networked computing system can generate synchronization source/slave assignments and configure synchronization signals.

Although FIG. 3 illustrates an example of an electronic device 300 in a computing system for managing a shared spectrum among a plurality of base stations, such as base stations 101, 102, and 103 in FIG. 1, various changes may be made to FIG. 3. For example, various components in FIG. 3 can be combined, further subdivided, or omitted and additional components could be added according to particular needs. In addition, as with computing and communication networks, servers can come in a wide variety of configurations, and FIG. 3 does not limit this disclosure to any particular electronic device.

Figure 4:
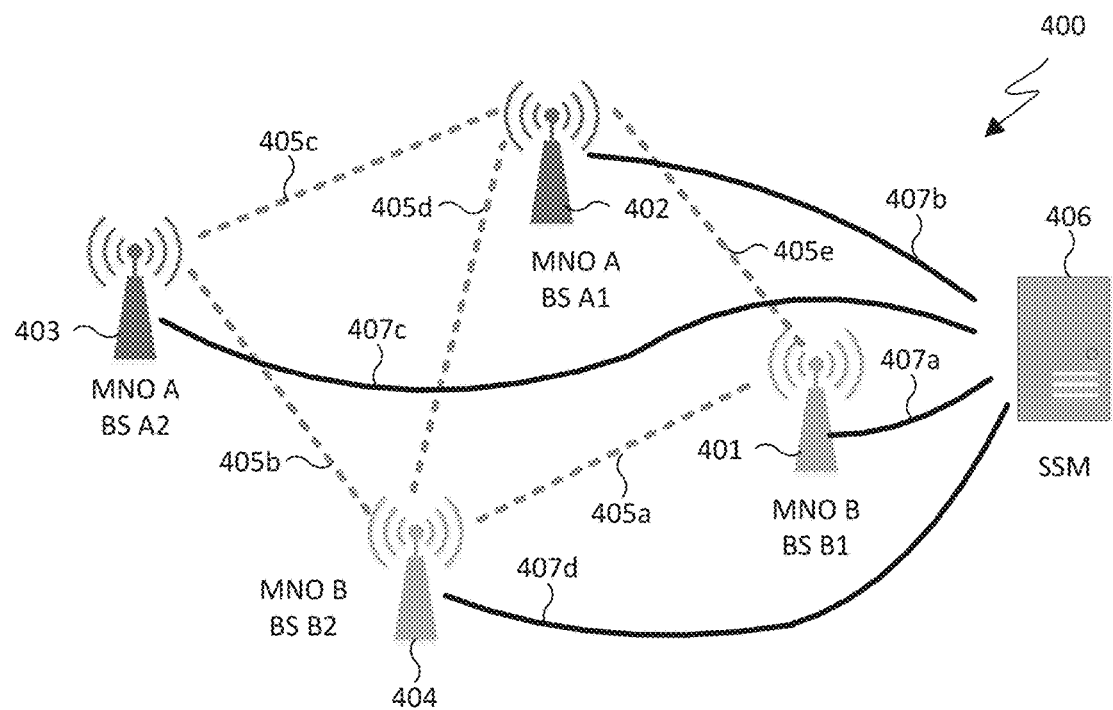
FIG. 4 illustrates a network for spectrum sharing according to various embodiments of this disclosure.

FIG. 4 illustrates a network for spectrum sharing according to various embodiments of this disclosure. Network 400 is a network computing system such as networked computing system 100 in FIG. 1.

The network 400 includes multiple BSs from different mobile network operators (MNOs), i.e., wireless service providers, coexisting in proximity with each other. As an example, BS 401 and BS 404 belong to the same MNO, e.g., "MNO B", and BS 402 and BS 403 belong to another operator, e.g., "MNO A". However, the particular depiction of the network in FIG. 4 is exemplary and not limiting. Thus, in other embodiments, the number of mobile network operators can differ, each with different systems and technologies sharing the spectrum.

In FIG. 4, BSs that interfere with one another are connected by dashed lines 405. For example, BS 401 and BS 404 interfere with each other and are connected by dashed line 405a; BS 401 and BS 402 interfere with each other and are connected by dashed line 405e; BS 402 and BS 404 interfere with each other and are connected by dashed line 405d; BS 403 and BS 404 interfere with each other and are connected by dashed line 405b; and BS 403 and BS 402 interfere with each other and are connected by dashed line 405c. BS 401 and BS 403 are separated by enough of a distance to prevent interference with one another.

Each of the BSs 401, 402, 403, and 404 are connected by their respective backhaul links 407 to shared spectrum manager (SSM) 406. SSM 406 is one or more electronic devices for managing the shared spectrum, such as electronic device 300 in FIG. 3. In a non-limiting embodiment, the SSM 406 is an entity in the core network of each MNO and configured to communicate with each other to manage the shared spectrum among BSs of all the MNOs. In another non-limiting embodiment, the SSM 406 is a third-party entity that does not belong to any of the MNOs but is configured to communicate with the different operators' networks for managing the shared spectrum among BSs of the MNOs.

Figure 5:
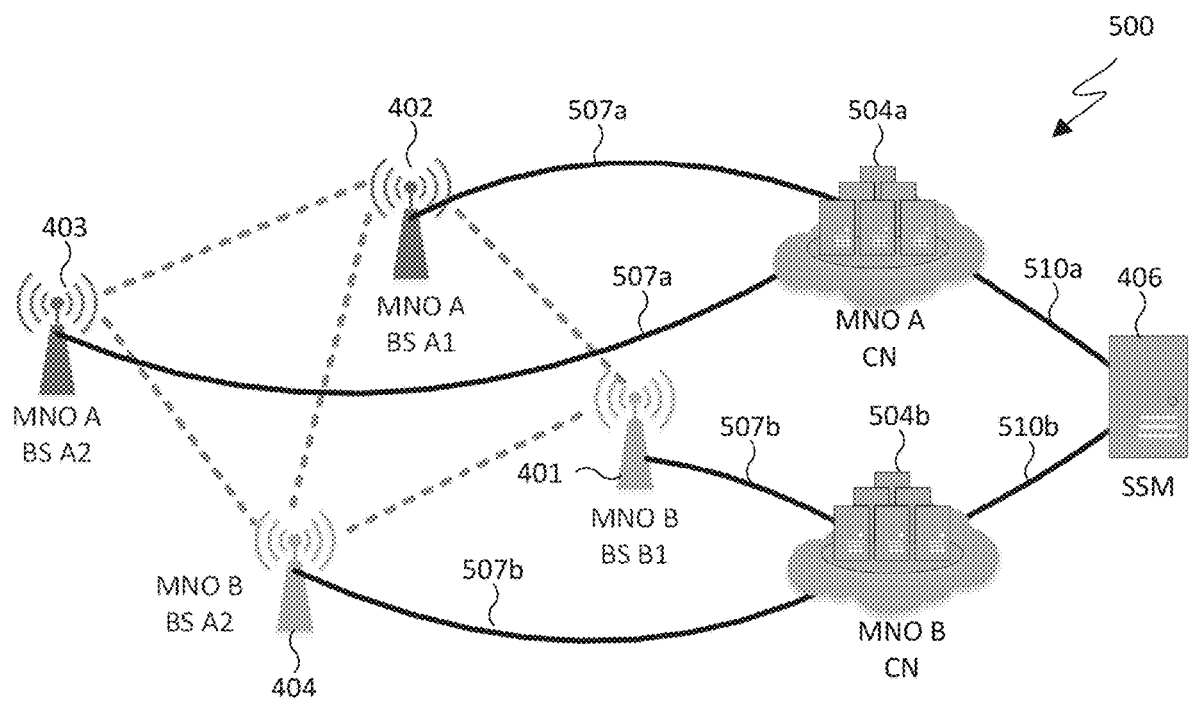
FIG. 5 illustrates another network for spectrum sharing according to various embodiments of this disclosure.

FIG. 5 illustrates another network for spectrum sharing according to various embodiments of this disclosure. Network 500 is a network computing system such as networked computing system 100 in FIG. 1.

The network 500 differs from the network 400 in that each BS communicates with an entity in its own MNO core network (CN) over backhaul links 507 rather than communicating directly to SSM 406. In this embodiment in FIG. 5, BSs 402 and 403 communicate with CN entity 504a over backhaul links 507a and BSs 401 and 402 communicate with CN entity 504b over backhaul links 507b. The CN entities 504a and 504b communicate with SSM 406 over their respective communication links 510. CN entities 504a and 504b can handle aggregation of data and/or transfer of messages, such as measurement reports, from the BSs to the SSM 406. The CN entities may also handle reception of messages from the SSM 406 on behalf of the BSs along with handling configuration of the BSs based on the parameters in these messages.

Figure 6A:
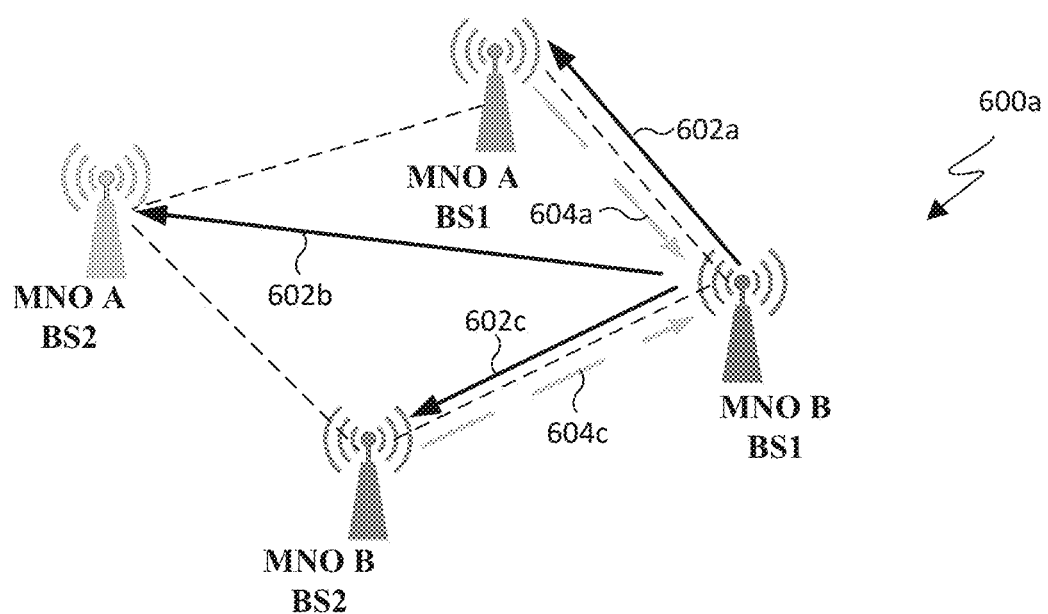
FIG. 6A illustrates control signal exchange between BSs in a shared spectrum network according to various embodiments of this disclosure.

FIG. 6A illustrates control signal exchange between BSs in a shared spectrum network according to various embodiments of this disclosure. Network 600a is a portion of a shared spectrum network, such as network 400 in FIG. 4, which includes a depiction of the exchange of control signals over-the-air (OTA) for coordinating and reserving spectrum resources. In this illustrative embodiment in FIG. 6A, MNO B BS1 transmits coordination request signals 602a, 602b, and 602c to MNO A BS1, MNO A BS2, and MNO B BS2, respectively. MNO B BS1 receives coordination response signals 604a and 604c from interfering BSs MNO A BS1 and MNO B BS2 in response.

Figure 6B:
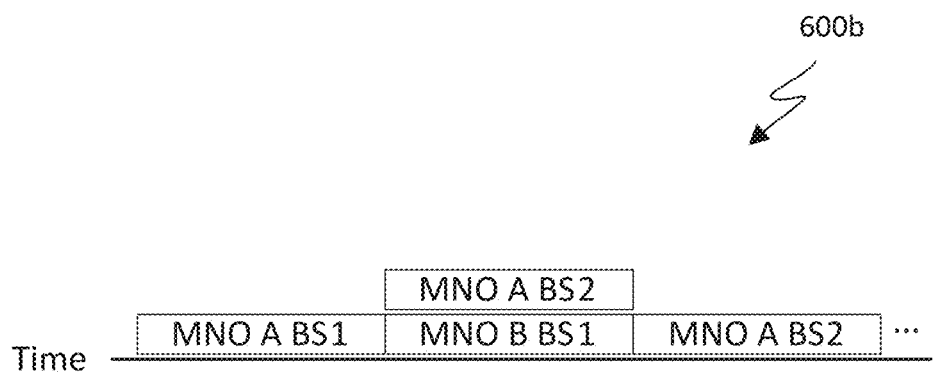
FIG. 6B illustrates resource reservation between BSs in a shared spectrum network according to various embodiments of this disclosure.

FIG. 6B illustrates resource reservation between BSs in a shared spectrum network according to various embodiments of this disclosure. The resources are reserved by the BSs in FIG. 6A. In particular, spectrum sharing is achieved by BSs belonging to different MNOs from network 600a. Since MNO A BS2 and MNO B BS1 are BS are geographically separated from each other and not in an interfering relationship, evident from the lack of a dashed line connecting the two, both of the BSs may transmit simultaneously. On the other hand, MNO A BS1, MNO B BS1, and MNO B BS2 are connected by dashed lines and in an interfering relationship. Therefore, they share resources in an orthogonal manner. The sharing can be enabled in time and/or geographical domains. That is, the spectrum can be shared in a time division multiplexing (TDM) manner between systems/technologies, and/or the spectrum can be reused simultaneously by geographically separated systems/technologies via spatial reuse. The sharing framework disclosed in the embodiments of the disclosed system can achieve the above time and/or geographical sharing in a localized and autonomous manner.

Figure 7:
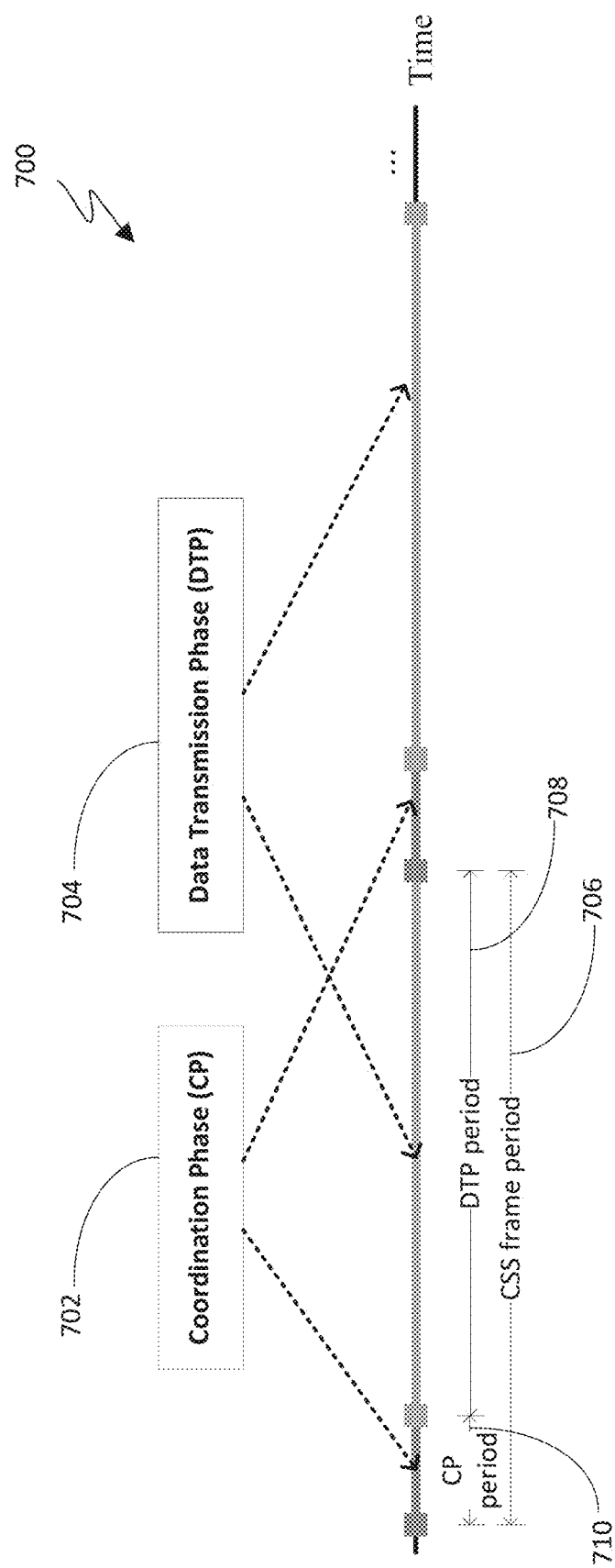
FIG. 7 illustrates a coordinated spectrum sharing framework according to various embodiments of this disclosure.

FIG. 7 illustrates a coordinated spectrum sharing framework (CSS) according to various embodiments of this disclosure. The CSS framework depicts the resources that are shared among the BS in a shared spectrum network, such as network 400 in FIG. 4.

An embodiment of the coordinated sharing (CSS) framework can include a coordination phase (CP) and data transmission phase (DTP), which enables spectrum sharing. Each CSS frame includes a coordination phase (CP) 702 and a data transmission phase (DTP) 704. The CP 702 can be used for OTA communications between BSs of same/different operators.

Each CSS frame has a CSS frame period 706 with a predetermined duration. The CSS frame period 706 includes a CP period 710, corresponding to CP 702, and a DTP period 708, corresponding to DTP 704. During the CP period 710, each BS can perform identification of the neighboring BSs, parameter negotiation, resource reservation for the following DTP and/or other DTPs, and other coordination operations. Coordinated data transmissions by BSs can be sent and received during the DTP period 708 based on the resource reservations made during the CP period 710. Opportunistic data transmission may also occur based on a listen-before-talk protocol (LBT) during the DPT period 708 when the reserved medium is not utilized. In another embodiment, the CP 702 and DTP 704 can use different frequency or code resources.

Figure 8:
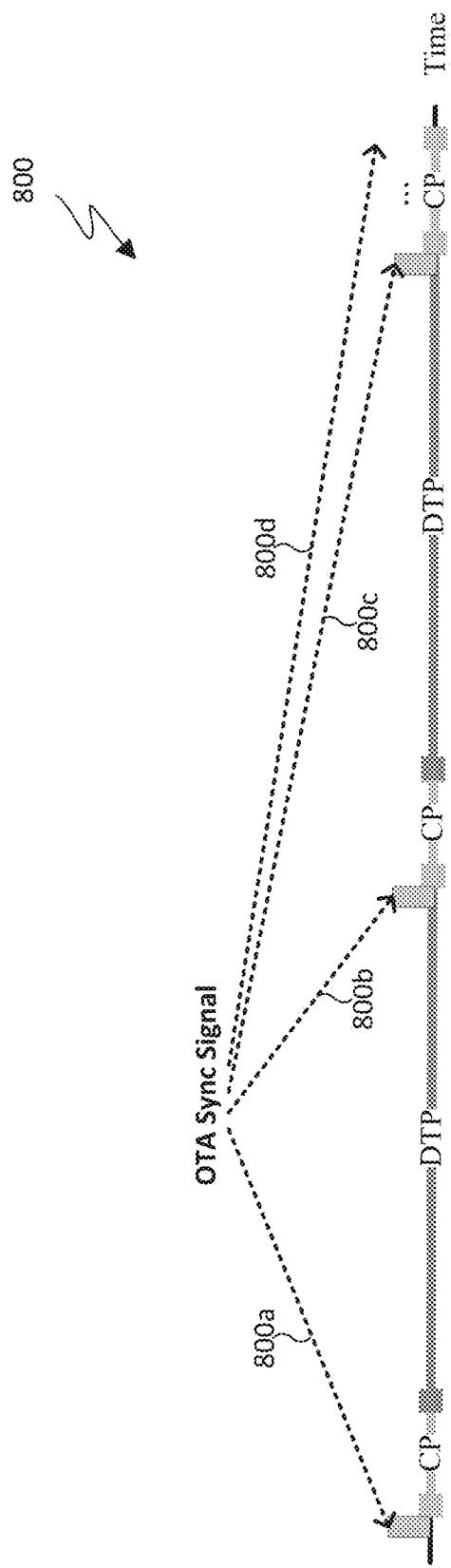
FIG. 8 illustrates inter-BS timing synchronization according to various embodiments of this disclosure.

FIG. 8 illustrates inter-BS timing synchronization according to various embodiments of this disclosure. Time synchronization is performed between BSs of a shared spectrum network by transmission of wireless signals from a set of synchronization source base stations to a set of recipient base stations.

In an exemplary embodiment in FIG. 8, one or more OSSs 802 can be transmitted by one or more BSs in the shared spectrum network to enable other BSs to become synchronized. As previously discussed, transmission of the OSS 800 can be triggered periodically, with some duty cycle or pattern, or aperiodically, by some event such as a signal from another BS or network entity. The OSS 800 is depicted as being transmitted in the DTP in FIG. 8, however, in other embodiments, the OSS 800 can be transmitted in the CP instead. It is also possible that the OSS transmission is not a part of CP or DTP but occurs during dedicated synchronization signal transmission period.

Figure 9:
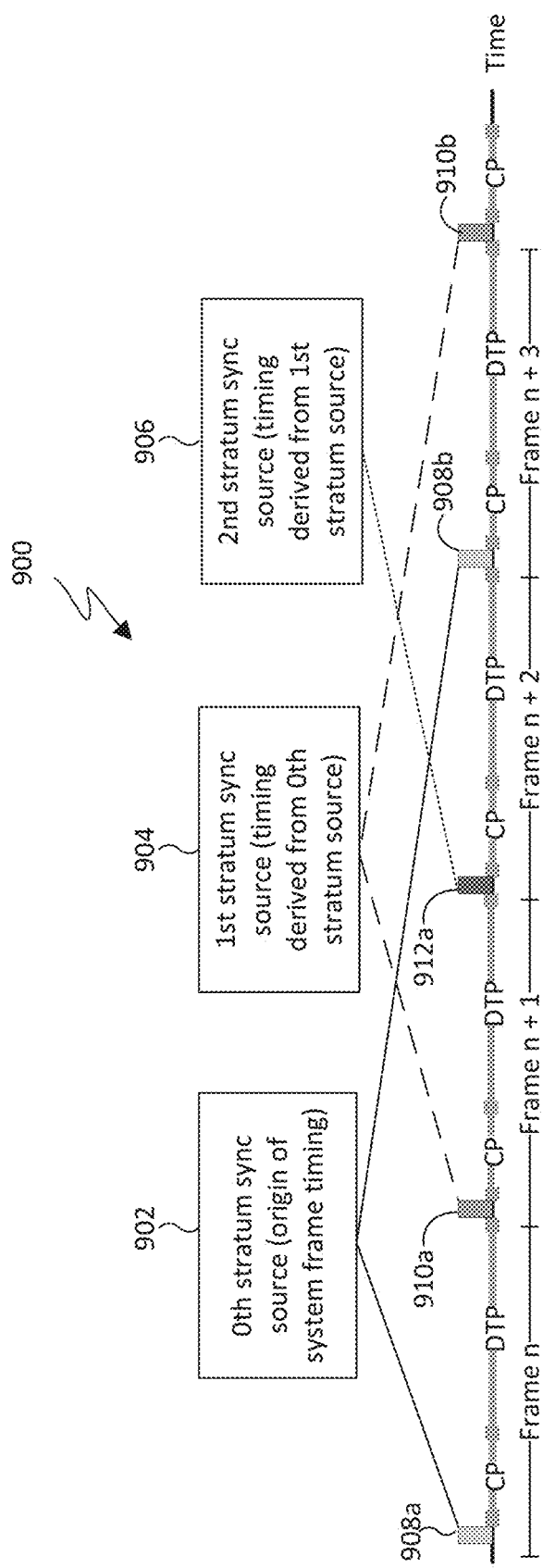
FIG. 9 illustrates transmission of an OSS in a coordinated spectrum sharing framework according to various embodiments of this disclosure.

FIG. 9 illustrates transmission of an OSS in a coordinated spectrum sharing framework according to various embodiments of this disclosure. In framework 900, the OTA sync signal (OSS) is transmitted in the beginning of shared spectrum system frame, e.g., at the start of the CP. In other embodiments, the OSS can be transmitted elsewhere in the CP, or in the DTP.

A 0th-stratum synchronization source 902 transmits OSSs 908a and 908b based on its frame timing. The OSSs 908a and 908b are transmitted in frame numbers (L*n+k), where L is a supported stratum of synchronization sources, k is a frame offset, and n is an integer. In the above example figure, L=3, k=0 for the 0th stratum synchronization source.

A 1st-stratum sync source 904 obtains frame timing based on the OSS 908 received from lower level (in level number) sync source. In this example in FIG. 9, sync source 904 obtains its frame timing based on the OSS from sync source 902.

The frame offset number for the sync source 904 is based on its stratum to determine the frames to transmit OSSs. For example, sync source 904 transmits OSSs 910a and 910b in frame numbers (L*n+k) where L=3, k=1, and n is an integer. The OSSs 910 contain a system frame number (SFN). Sync source 906 transmits OSS 912a in frame number (L*n+k) where L=3, k=2, and n is an integer. The OSSs 912 also contain a corresponding SFN.

Figure 10:
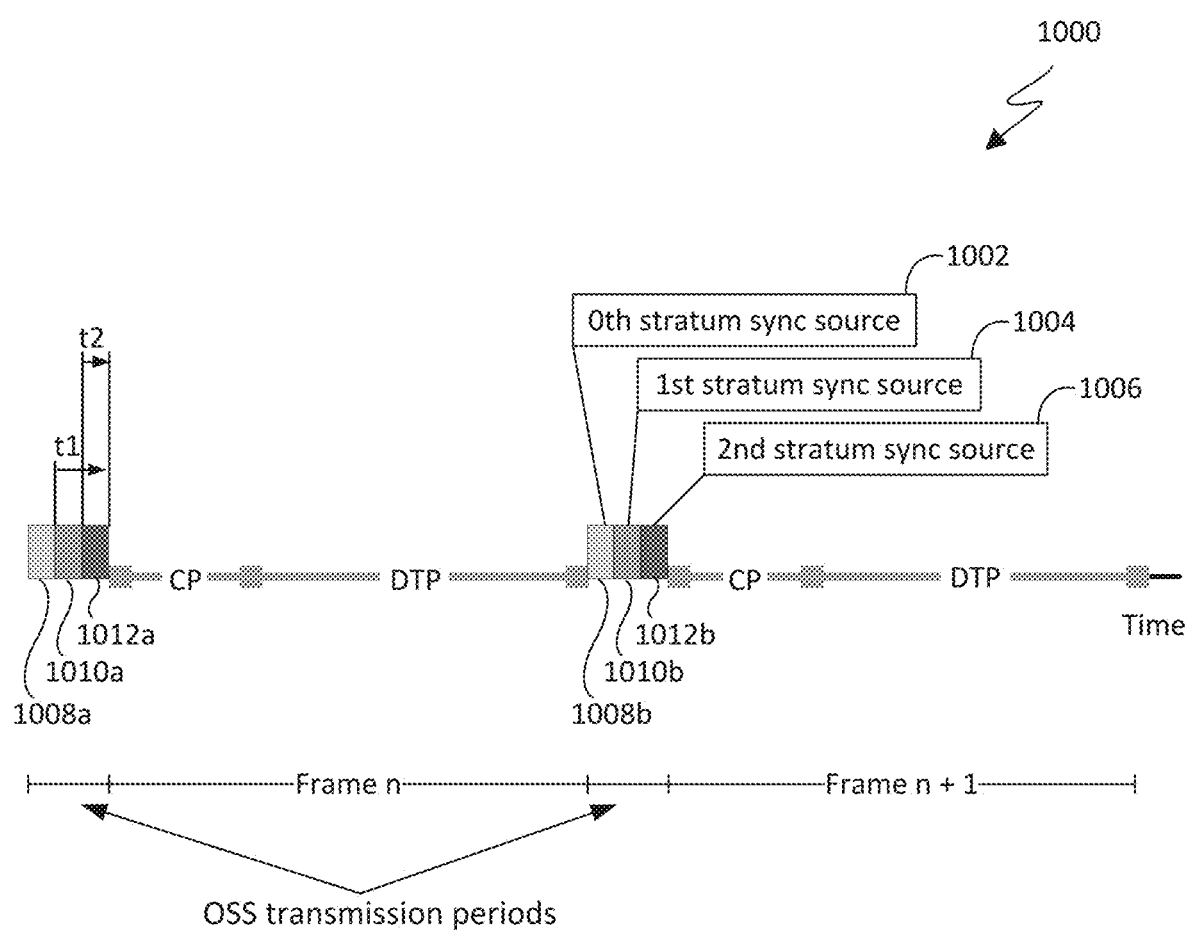
FIG. 10 illustrates an alternate transmission of an OSS in a coordinated spectrum sharing framework according to various embodiments of this disclosure.

FIG. 10 illustrates an alternate transmission of an OSS in a coordinated spectrum sharing framework according to various embodiments of this disclosure. In framework 1000, the OSS transmission period is predefined and OSSs from different sync source stratums are staggered. In this example in FIG. 10, the OSS transmission period is prior to the CP and is configured to support up to three sync sources, i.e., up to a 2nd-stratum sync source.

OSS transmission period occurs in every N frame. In the depicted example, N=1 so that OSS transmission occurs in every frame. The 0th-stratum sync source 1002 transmits OSSs 1008a and 1008b based on its frame timing. Depending on the depth of the OSS transmission period, indicate the time gap, e.g., t1 in the above example, based on the start of the frame. The OSS contains SFN.

The 1st-stratum and 2nd-stratum sync sources obtain frame timing based on an OSS received from a lower stratum sync source. For example, sync source 1004 obtains its frame timing for OSS transmission periods 1010a and 1010b from OSS transmission periods 1008a and 1008b, and sync source 1006 obtains its frame timing for OSS transmission periods 1012a and 1012b from OSS transmission periods 1010a and 1010b.

In some embodiments, OSS transmission timing offsets are determined within the OSS transmission period based on the sync source stratum and OSSs are transmitted at the determined timing offset based on a corresponding time gap. For example, t1 for sync source 1004 and t2 for sync source 1006. The SFN received from the 0th-stratum sync source 1002 is repeated in the transmitted OSSs, e.g., OSS 1010a, 1010b, 1012a and 1012b.

Figure 11A:
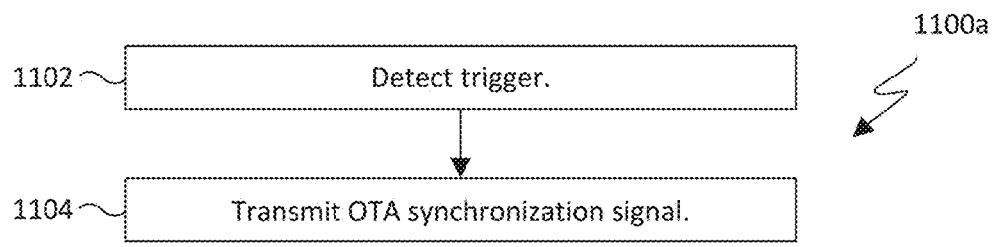
FIG. 11A illustrates a flowchart for transmitting OSS signals according to various embodiments of this disclosure.

FIG. 11A illustrates a flowchart for transmitting OSS according to various embodiments of this disclosure. Operations of flowchart 1100a can be implemented in a BS, such as BS 200 in FIG. 2.

Flowchart 1100a begins at operation 1102 by detecting a trigger. The trigger can be periodic, such as a timer, or aperiodic, such as an event or signal from another BS in the spectrum sharing network or a network entity, such as SSM 406 in FIG. 4. In operation 1104, an OSS is transmitted to another BS.

Figure 11B:
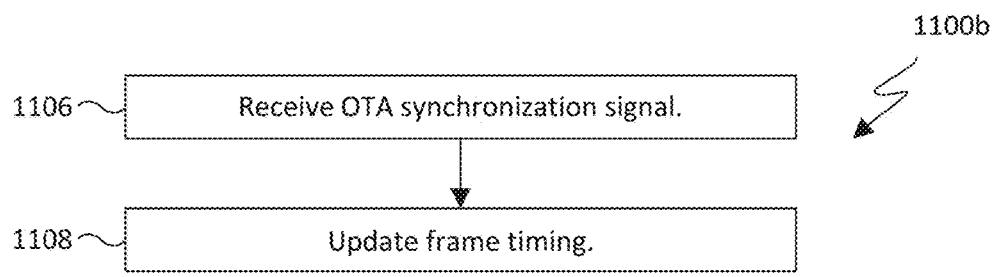
FIG. 11B illustrates a flowchart for receiving OSS signals according to various embodiments of this disclosure.

FIG. 11B illustrates a flowchart for receiving OSS according to various embodiments of this disclosure. The operations of flowchart 1100b can be implemented in a BS, such as BS 200 in FIG. 2.

In operation 1106 an OSS is received. Based on the received OSS, frame timing is updated in operation 1108. In some embodiments, flowchart 1100b may also include the operations of flowchart 1100a the BS receiving the OSS signals is a master BS to one or more slave BSs, as shown in more detail in FIG. 12.

Each of the BSs sending and receiving OSS signals may belong to different MNO networks. In one embodiment, BSs may receive OSS to initially set their frame timing once. In another embodiment, BSs may continue to update their frame timing based on the received OSS and may do so periodically, triggered by some timer, or aperiodically, after being triggered by some event or a signal from another BS or network entity.

Figure 12:
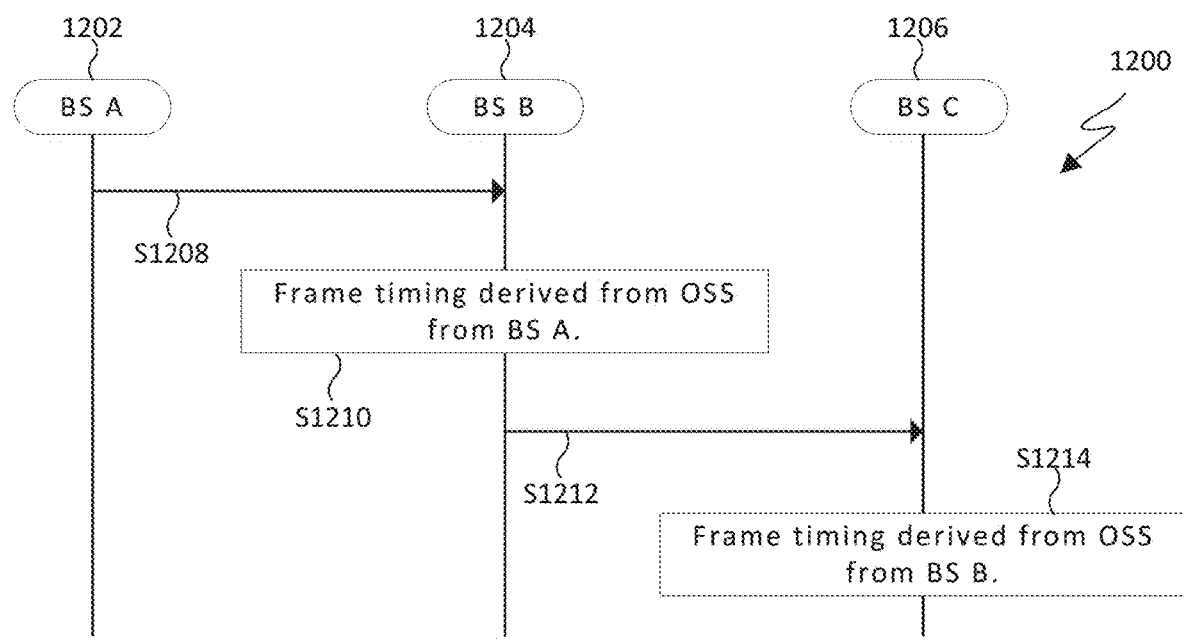
FIG. 12 illustrates a signal flow diagram for transmitting and receiving OSS between BSs for deriving frame timing according to various embodiments of this disclosure.

FIG. 12 illustrates a signal flow diagram for transmitting and receiving OSS between BSs for deriving frame timing according to various embodiments of this disclosure. In this example, BS A 1202 is a synchronization source to BS B 1204. BS B 1204 is a slave BS to BS A 1202 and also a synchronization source to BS C 1206. BS C 1206 is a slave BS to BS B 1204.

BS A 1202 transmits an OSS to BS B in S1208. BS B 1204 uses the OSS received from BS A 1202 to derive its frame timing in S1210. BS B 1204 transmits an OSS to BS C 1206 in S1212. In S1214 BS C 1206 derives its frame timing from the OSS received from BS B 1204.

The BSs depicted in FIG. 12 can be depicted in a tree structure based with BS A 1202 as a root node in a 0th level stratum, BS B 1204 as a node in a 1st level stratum, and BS C 1206 as a node in a 3rd level stratum. An example of a hierarchical tree structure assigning BS nodes to stratums is depicted and discussed in more detail in FIG. 16B.

Figure 13:
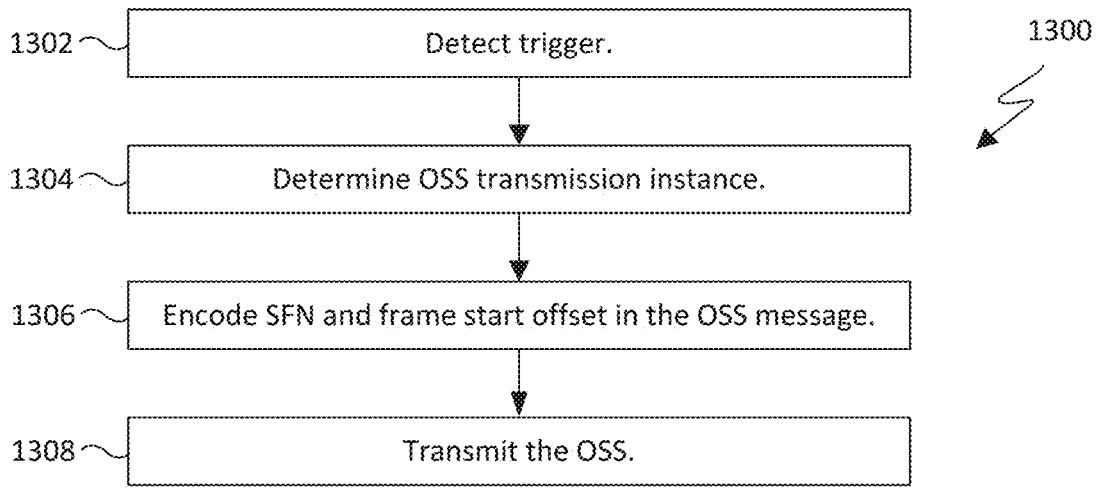
FIG. 13 illustrates a flowchart for transmitting OSSs by a synchronization source according to various embodiments of this disclosure.

FIG. 13 illustrates a flowchart for transmitting OSSs by a sync source according to various embodiments of this disclosure. Operations of flowchart 1300 can be implemented in a BS, such as BS 200 in FIG. 2. More particularly, the operations of flowchart 1300 can be implemented by a sync source BS in the 0th level stratum, such as BS A 1202 in FIG. 12.

Flowchart 1300 begins at operation 1302 by detecting a trigger. The trigger can be periodic or aperiodic. One example of an aperiodic trigger is an OSS transmission request from another BS in a shared spectrum network. In operation 1304, an OSS transmission instance is determined. In operation 1306, the system frame number (SFN) and frame start offset is encoded into an OSS message. The OSS message is transmitted in operation 1308.

Figure 14:
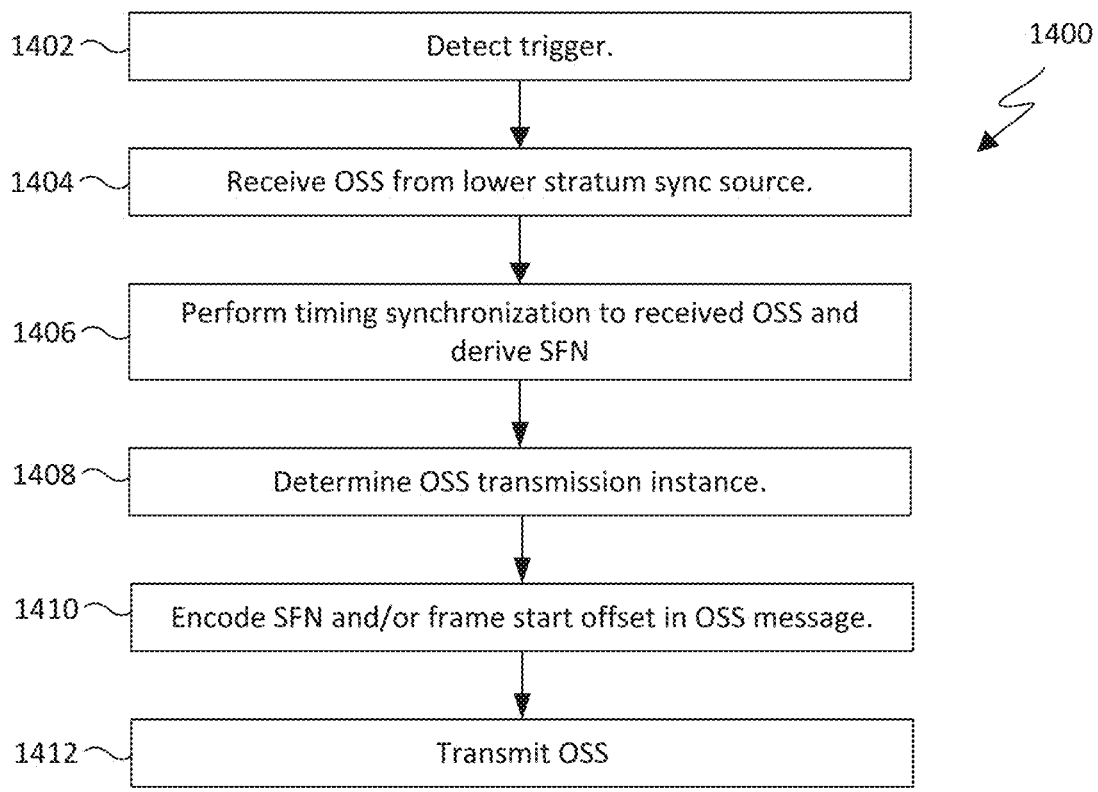
FIG. 14 illustrates another flowchart for transmitting OSSs by a synchronization source according to various embodiments of this disclosure.

FIG. 14 illustrates another flowchart for transmitting OSSs by a sync source according to various embodiments of this disclosure. Operations of flowchart 1400 can be implemented in a BS, such as BS 200 in FIG. 2. More particularly, the operations of flowchart 1400 can be implemented by a sync source that is not in the 0th level stratum, such as BS B 1204 in FIG. 12.

Flowchart 1400 begins at operation 1402 by detecting a trigger. The trigger can be periodic or aperiodic. In operation 1404, an OSS is received from a sync source in a lower stratum. In operation 1406, timing synchronization is performed using the received OSS and an SFN is derived.

In operation 1408, an OSS transmission is determined. In operation 1410, the SFN and/or the frame start offset is encoded in an OSS message. The OSS message is transmitted in operation 1412.

Figure 15:
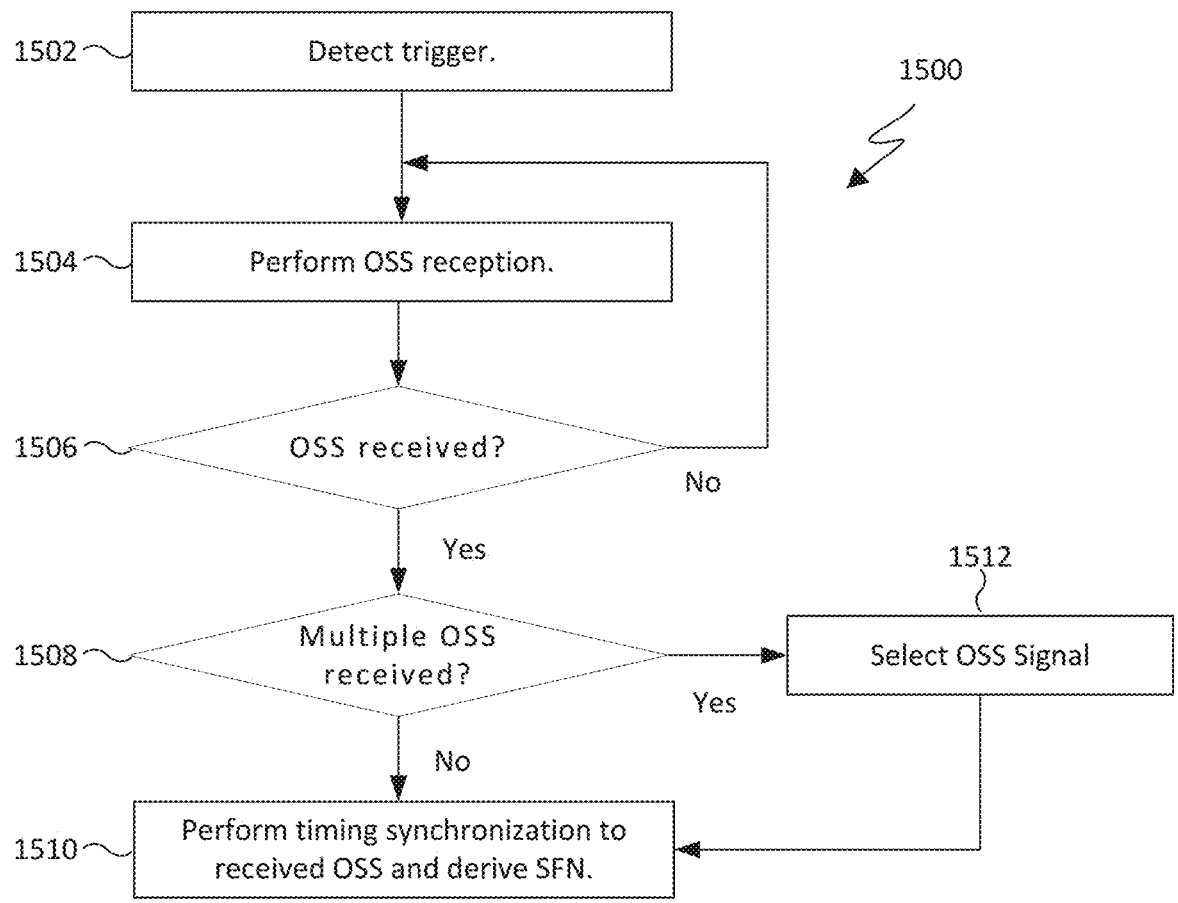
FIG. 15 illustrates a flowchart for receiving OSSs by a slave BS according to various embodiments of this disclosure.

FIG. 15 illustrates a flowchart for receiving OSSs by a slave BS according to various embodiments of this disclosure. Operations of flowchart 1500 can be implemented in a BS, such as BS 200 in FIG. 2. More particularly, the operations of flowchart 1500 can be implemented by a slave BS, such as BS C 1206 in FIG. 12.

Flowchart 1500 begins at operation 1502 by detecting a trigger for performing a synchronization. The trigger can be periodic or aperiodic. An example of a trigger is detecting asynchronization. In operation 1504, OSS reception is performed. The OSS is received from a sync source in a lower stratum.

In operation 1506 a determination is made as to whether an OSS is received. If an OSS is not received, then flowchart 1500 returns to operation 1504. However, if an OSS is received, then flowchart 1500 proceeds from operation 1506 to operation 1508 where a determination is made as to whether multiple OSSs are received. If multiple OSSs are not received, then timing synchronization is performed based on the received OSS and an SFN is derived in operation 1510. However, if multiple OSSs are received in operation 1508, then flowchart 1500 proceeds to operation 1512 where an OSS is selected from the multiple OSSs that are received. Flowchart 1500 then proceeds to operation 1510.

Relationships between BSs transmitting OSS with a given timing, and other BSs receiving OSS to derive their CSS frame timing, creates a hierarchy of master BSs (i.e., the OSS transmitters) and slave BSs. The hierarchy is depicted in FIGS. 16A and 16B where BSs are shown as nodes with interference relationships depicted by dashed lines.

Figure 16A:
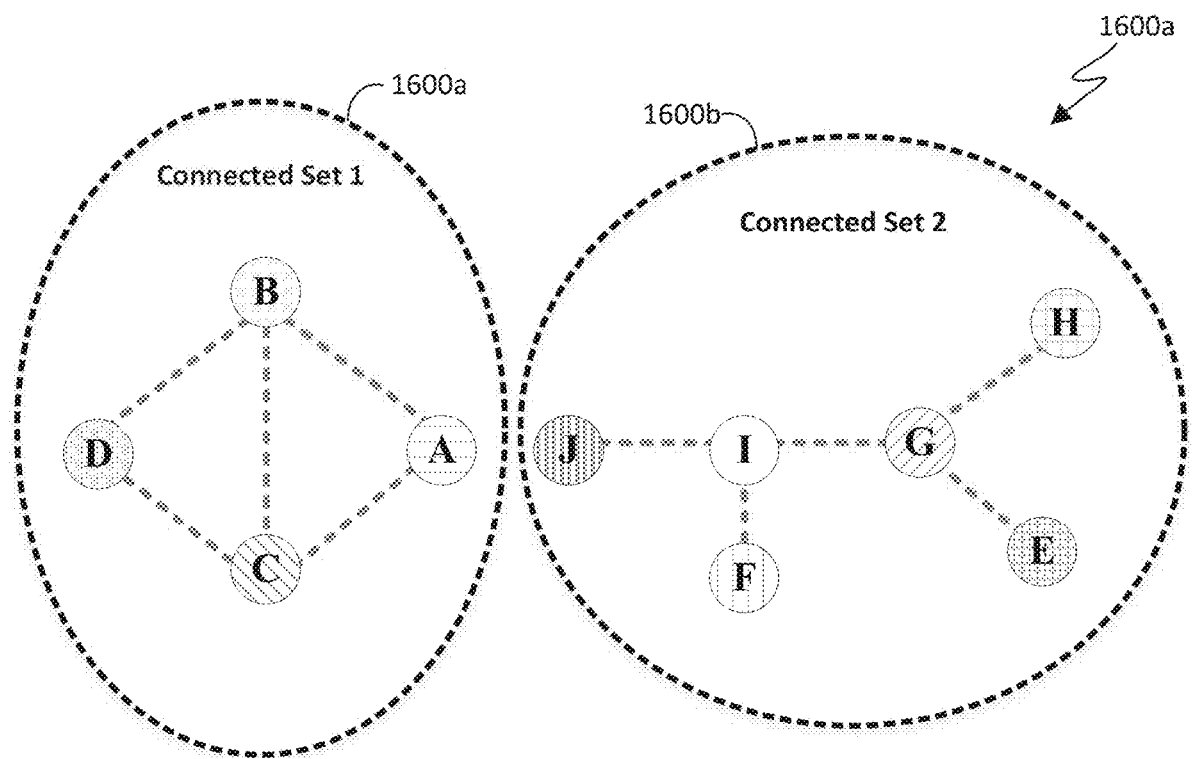
FIG. 16A illustrates an interference graph of BS nodes in a shared spectrum network according to various embodiments of this disclosure.
Figure 16B:
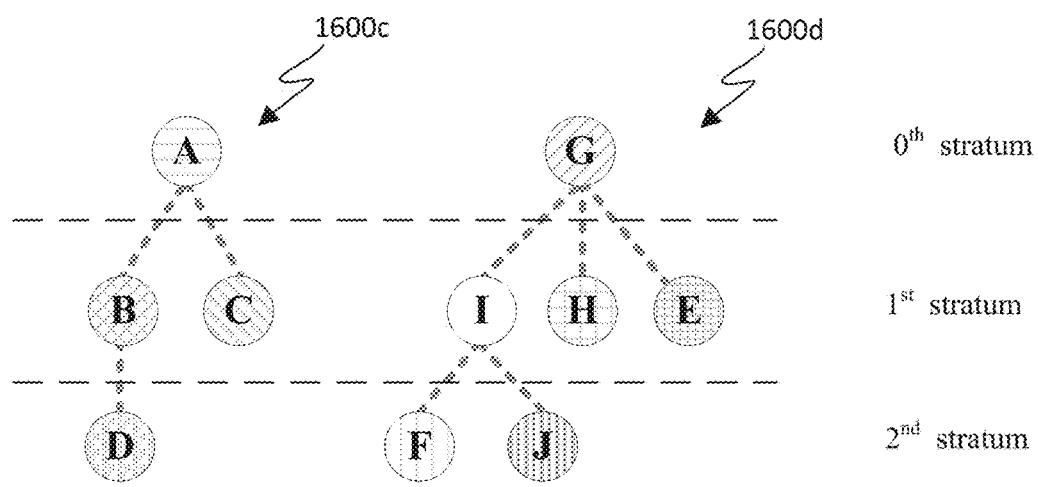
FIG. 16B illustrates tree diagrams depicting the hierarchy of the BS nodes in each of the connected sets in the interference graph of FIG. 16A.

FIG. 16A illustrates an interference graph of BS notes in a shared spectrum network according to various embodiments of this disclosure. In this non-limiting example, BS nodes A through J participate in a CSS network. Dashed lines between BS nodes represent interference relationships between two BS nodes, which indicate that the interference power between a pair of nodes exceeds some threshold. A pair of nodes having an interference relationship implies that a signal, e.g., OSS, transmitted from a node can be received at the other node.

As shown, the interference graph 1600 may be partitioned into two subgraphs or connected sets 1600*a* and 1600*b*, each of which includes a set of BS nodes that do not have any interference relationships with a BS node in the other connected set. In such a case, the timing of each connected set may be established independently from other connected sets, since OTA signals in the CP may not be needed to be received by BSs of another connected set, and there may not be significant interference between BSs of different connected sets from control message transmission opportunities or data slot timing misalignment.

Within each connected set, a BS synchronizes to one or more neighboring BSs following the general procedure in FIG. 12. The resulting hierarchy can be visualized in the form of a tree structure, exemplified in FIG. 16B.

FIG. 16B illustrates tree diagrams depicting the hierarchy of the BS nodes in each of the connected sets in the interference graph of FIG. 16A. Each of the hierarchical trees 1600*c* and 1600*d* is rooted at one master sync source that provides reference timing for the entire connected set.

In FIG. 12B dashed lines represent a master/slave synchronization relationship, where slave BSs may derive their timing from the OSS signal of the respective master. Each connected set may have at least one root synchronization source and may have multiple roots. Multiple roots may be designated in such a case that multiple BS nodes with Global Positioning System (GPS) or Precision Time Protocol (PTP)-based absolute timing references are available within the connected set, which enable these BSs to transmit OSS signals with the same accurate timing and may lend to more accurate synchronization of the connected set. The number of hops, or intermediate synchronization source nodes between a given node and the root, in the synchronization hierarchy is referred to in this disclosure as the stratum. Root nodes are said to be at stratum 0, nodes that synchronize directly to a root are at stratum 1, nodes that synchronize to stratum 1 nodes are at stratum 2, and so forth. Each successive stratum after stratum 0 may incur higher timing error, i.e. deviation from the root reference timing for the connected set, which occurs due to inaccuracy of estimating the timing from received OSS(s). Thus, this error may be propagated and further compounded by each intermediate synchronization source below the root in the hierarchy. Procedures for selecting synchronization source and establishing this stratified hierarchy are presented in later sections of the disclosure.

OTA Synchronization Signals

As discussed, OSS are signals that are transmitted by BSs to facilitate synchronization of other BSs. In one embodiment, an OSS may take the form of a simple pulse of RF energy or a training sequence, for example a Zadoff-Chu or M-sequence, which are respectively used for the Primary Synchronization Signal (PSS) and Secondary Synchronization Signal (SSS) transmitted by LTE base stations for user equipment (UE) synchronization. In another embodiment, in the case that base stations already transmit synchronizations signals, such as the LTE PSS/SSS, for UE synchronization, the same signals may be reused for inter-BS synchronization. Alternatively, BSs may transmit a separate OSS in addition to UE synchronization signals. Additionally, in a further embodiment, the OSS may include system information, which can be decoded by receiving BSs. Such system information may include, but is not limited to:

the BS ID (e.g. Physical Cell ID, Cell Global Identifier, etc.), network or PLMN (Public Land Mobile Network) ID, and/or the synchronization source stratum of the BS and/or an indicator of availability of an absolute (e.g. GPS or PTP) timing source at the BS.

The same information elements may be transmitted as part of the OSS or may be included in the standard system information signals transmitted by the BS for UE initial attach, for example the Master Information Block (MIB) or System Information Block (SIB) signals in the LTE system.

Centralized Synchronization Source Configuration

In some embodiments, management of timing synchronization in a CSS is achieved by a central network entity. The central network entity can be an SSM 406, as shown in FIG. 17.

Figure 17:
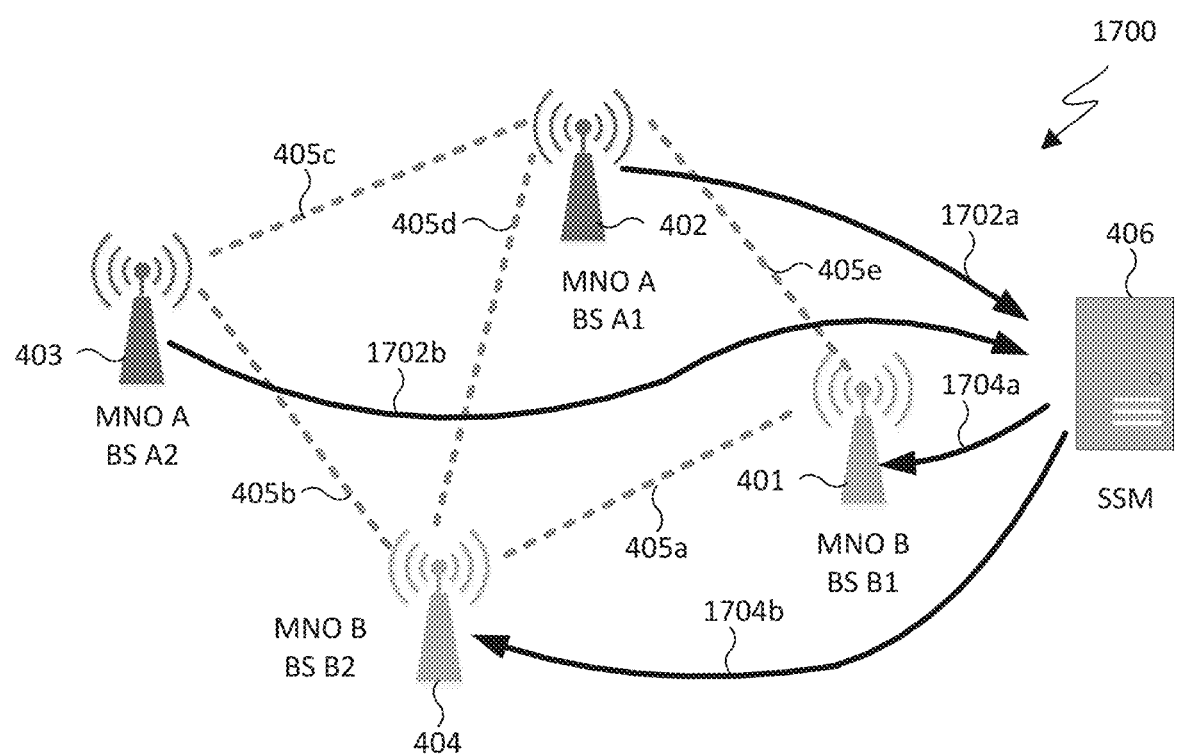
FIG. 17 illustrates communication of messages between components of a shared spectrum network according to various embodiments of this disclosure.

FIG. 17 illustrates communication of messages between components of a shared spectrum network according to various embodiments of this disclosure. Network 1700 is a shared spectrum network, such as network 400 in FIG. 4.

A central network entity, namely the SSM 406, is responsible for assisting BSs that are joining the network to discover synchronization sources and become synchronized with the network or connected set. The SSM 406 also handles other cases of network topology or configuration changes, such as when a synchronization source goes offline or becomes unavailable or when the interference relationships between BSs change.

The SSM 406 may manage the configuration of the CSS network 1700 by sending synchronization management indication (SMI) messages 1704*a* and 1704*b* to BSs over their respective backhaul links, which can be wired or wireless, or core network, as shown in FIG. 17. Additionally, BSs may report information to the SSM 406 via synchronization measurement report (SMR) messages 1702*a* and 1702*b* over the backhaul/CN. The details of these messages and the procedures for onboarding new BS and handling topology changes are given in the following sections.

Centralized New Base Station Synchronization Source Discovery and Association

BSs that are newly installed, or become active after some period of inactivity, may need to (re)discover neighboring synchronization sources and associate with a master BS. In an exemplary centralized sync source discovery and association procedure, shown in FIG. 18 and FIG. 19, BS sync source discovery and association with a master BS is facilitated by an SSM entity.

Figure 18:
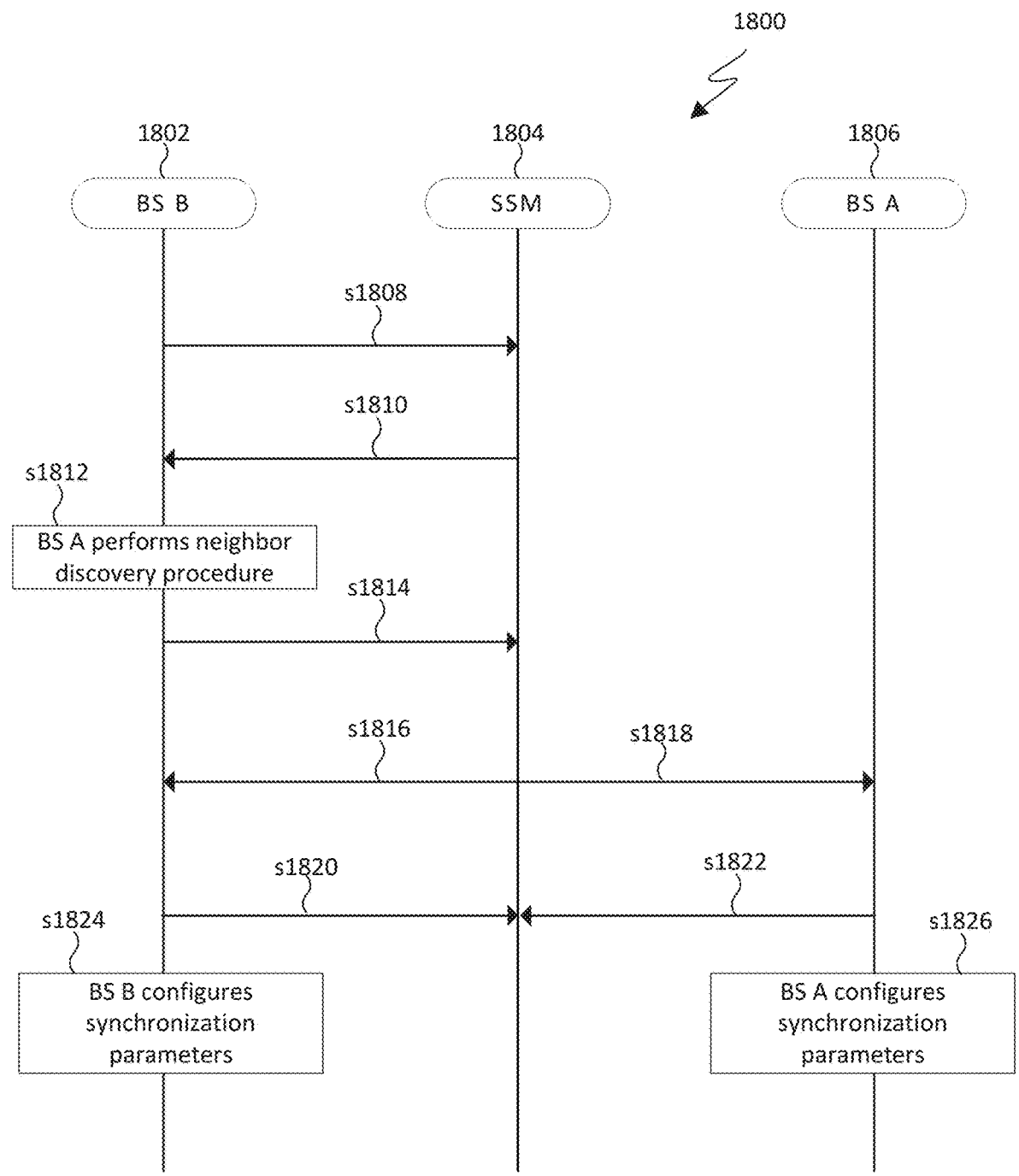
FIG. 18 illustrates a signal flow diagram for synchronization source discovery and association in a centralized shared spectrum according to various embodiments of this disclosure.

FIG. 18 illustrates a signal flow diagram for sync source discovery and association in a centralized shared spectrum according to various embodiments of this disclosure. In this non-limiting example in FIG. 18, BS B 1802 has become newly active in a shared spectrum network that already includes SSM 1804 and BS A 1806, such as network 400 in FIG. 4.

In s1808, BS B 1802 sends a request for an SMI. In one embodiment, the request may be a keep-alive signal, which is a simple indication of the BS activity. In another embodiment, the request may be included as part of an SMR, which may include system information about BS B 1802, including geographic coordinates of BS B 1802 or an indication of the availability of a GPS or P2P timing reference. The SMR may also contain an indication of whether BS B 1802 allows itself to be designated a sync source, since it may be the case that BS B 1802 is unable to serve as a sync source or has opted not to serve as a sync source for transmitting OSSs.

The BS B 1802 may also indicate in the SMR that it requires or prefers a BS in the same MNO network or PLMN to be assigned as its sync source.

In s1810 the SSM 1804 responds to the request with an SMI message, which may include neighborhood discovery assistance information to assist the BS B 1802 to discover neighboring BSs. The neighborhood discovery information may include, as an example, the IDs or synchronization sequence index of other BSs in the same geographic area, which may be used by the new BS to determine a set of the synchronization sequences, transmitted as part of the OSS, for which to search. Narrowing the search space of possible OSS sequences to a limited set may reduce the delay involved in discovering neighboring synchronization sources compared to blindly searching all possible OSS sequences.

In s1812, BS B 1802 performs a neighbor discovery procedure by scanning for OSS signals of neighboring BSs. In operation s1814, BS B 1802 transmits an SMR to the SSM 1804 that includes the discovered neighbor BS IDs. Additional information about the neighbor BSs can also be included, such as PLMN ID, synchronization source status (i.e., whether the BS is an active synchronization source) and stratum. This information may be detected from the neighbor BSS OSS, MIB or SIB.

In s1816, the SSM 1804 can respond to the SMR transmitted in s1814 with an SMI that includes configuration information, such as the master synchronization source assignment for BS B 1802. In some embodiments, the SMI can designate the BS B 1802 as a sync source. In these embodiments, the sequence index used to generate a synchronization sequence can be specified in the SMI. The SSM 1804 may determine that the configuration of other BSs, e.g. BS A 1806, also need to be updated as a result of BS B 1802 becoming active. Accordingly, in s1818 SSM 1804 can send an SMI to one or more other BSs in the shared spectrum network in addition to the BS B 1802, which may trigger the other BSs to update their configurations, possibly changing their master synchronization source and updating their own frame timing.

For example, the SMI transmitted from SSM 1804 to BS A 1806 in s1818 can configure the BS A 1806, a sync source BS, to reserve some uplink resources for inter-BS communication from BS B 1802. These uplink resources can include Random Access Channel (RACH) time/frequency resources and/or a random access preamble to be used for BS B 1802 to perform the random access procedure toward the master BS A 1806 to acquire such information as the timing advance (TA). Additional details on the inter-BS information request/response and timing advance are disclosed in a later section.

In s1820, BS B 1802 transmits an acknowledgment to SSM 1804 and in s1822, BS A 1806 transmits an acknowledgment to SSM 1804. In s1824, BS B 1802 can apply the configuration in the previous SMI received in s1816, which may entail becoming a slave BS to a designated master, such as BS A 1806 or becoming a synch source. If BS B 1802 is instructed to become a slave BS B 1802, then it may then set its frame timing according to the OSS of the specified master. BS B 1802 may also continue to monitor further OSSs transmitted by the master and update its frame timing. Alternatively, if BS B 1802 is designated as a sync source, it may also begin transmitting an OSS with the configuration provided in the SMI in s1816.

In s1826, BS A 1806 may also apply the configuration in the SMI received in s1818 to update its synchronization configuration and, for example, reserve RACH or other uplink resources for inter-BS communication from BS B 1802.

One or more operations in the procedure may be optional and may be omitted or performed in an alternate order without detracting from the general purpose, which is the discovery of neighboring synchronization sources by a new BS and/or the configuration of synchronization-related parameters of the new BS by a centralized SSM entity.

Generally, if an added or removed BS is not a sync source, then its addition or removal does not affect system frame timing. If an added BS finds no sync source, then the added BS can become a 0th-stratum sync source and serve as the basis of frame timing. If the added BS is designated as n-th stratum sync source, where n>0, it will regenerate OSS based on the timing obtained from n−1th stratum. As it is existing frame timing regeneration, it does not affect the frame timing.

If the removed BS is a sync source and there exist BSs relying on the timing from the removed BS, a new BS needs to be assigned as a sync source. The new sync source BS derives timing from lower level sync source, the existing frame timing does not change. If the new sync source becomes a 0th-stratum sync source, then the frame timing can be reset.

Figure 19:
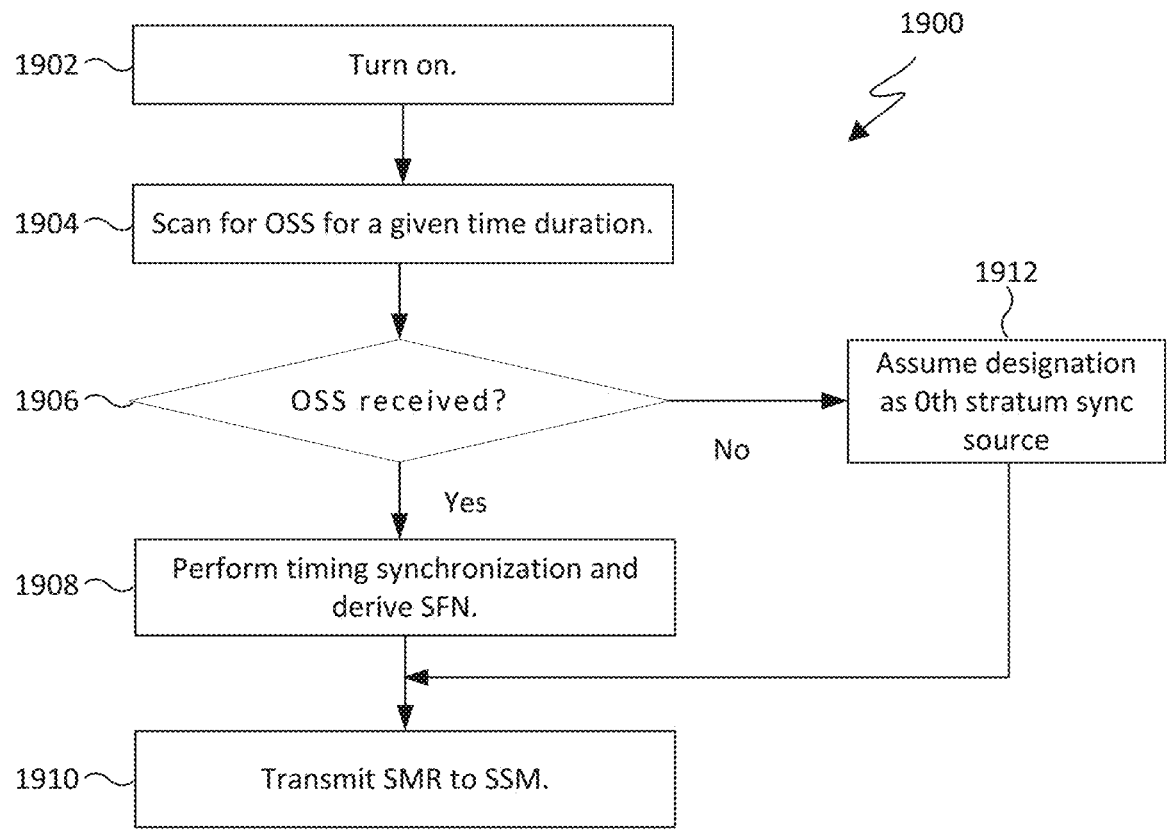
FIG. 19 illustrates a flowchart for synchronization of a BS in a centralized shared spectrum network according to various embodiments of this disclosure.

FIG. 19 illustrates a flowchart for synchronization of a BS in a centralized, shared spectrum network according to various embodiments of this disclosure. Operations of flowchart 1900 can be implemented in a BS, such as BS 200 in FIG. 2, that is newly joining an established shared spectrum network.

Flowchart 1900 begins at operation 1902 by turning on. In operation 1904, a scan is performed for OSS for a given time duration. A determination is then made in operation 1906 as to whether an OSS is received. If an OSS is received, then flowchart 1900 proceeds to operation 1908 where timing synchronization is performed and the SFN is derived. In operation 1910, an SMR is transmitted to the SSM. The SSM can, in response to receiving the SMR report, designate the new BS implementing flowchart 1900 as a higher-level sync source (i.e., not a root-level sync source). This new BS can then follow the operations of flowchart 1400.

Returning to operation 1906, if a determination is made that an OSS is not received, then in operation 1912 a designation as a 0th stratum sync source is assumed and flowchart 1900 proceeds to operation 1910.

Figure 20:
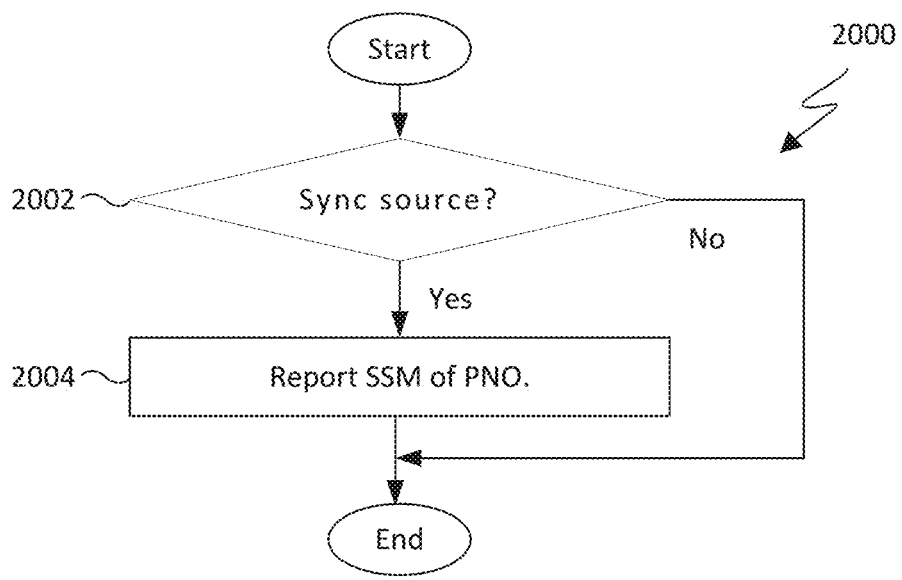
FIG. 20 illustrates a flowchart for operation of a BS scheduled for planned non-operation according to various embodiments of this disclosure.

FIG. 20 illustrates a flowchart for operation of a BS scheduled for planned non-operation according to various embodiments of this disclosure. Operations of flowchart 2000 can be implemented in a BS, such as BS 200 in FIG. 2. In particular, the BS is scheduled for planned non-operation (PNO).

Flowchart 2000 begins at operation 2002 by determining whether it is serving as a sync source. If a determination is made that it is not serving as a sync source, then the flowchart terminates. However, if the determination is made that it is serving as a sync source to one or more BSs, then flowchart 2000 proceeds from operation 2002 to operation 2004 and reports the PNO to its SSM. The flowchart terminates thereafter.

In response to receiving an SMR that reports the PNO to an SSM, the SSM can adjust the sync source/slave relationships of its BSs.

Centralized Synchronization Source Reconfiguration

Changes in the network topology, such as the addition of a BS, a BS becoming inactive or otherwise unavailable, or changes to the interference relationships between BSs may prompt the SSM to re-assign synchronization sources for one or more BSs. Examples are described in more detail in FIGS. 21A and 21B.

Figure 21A:
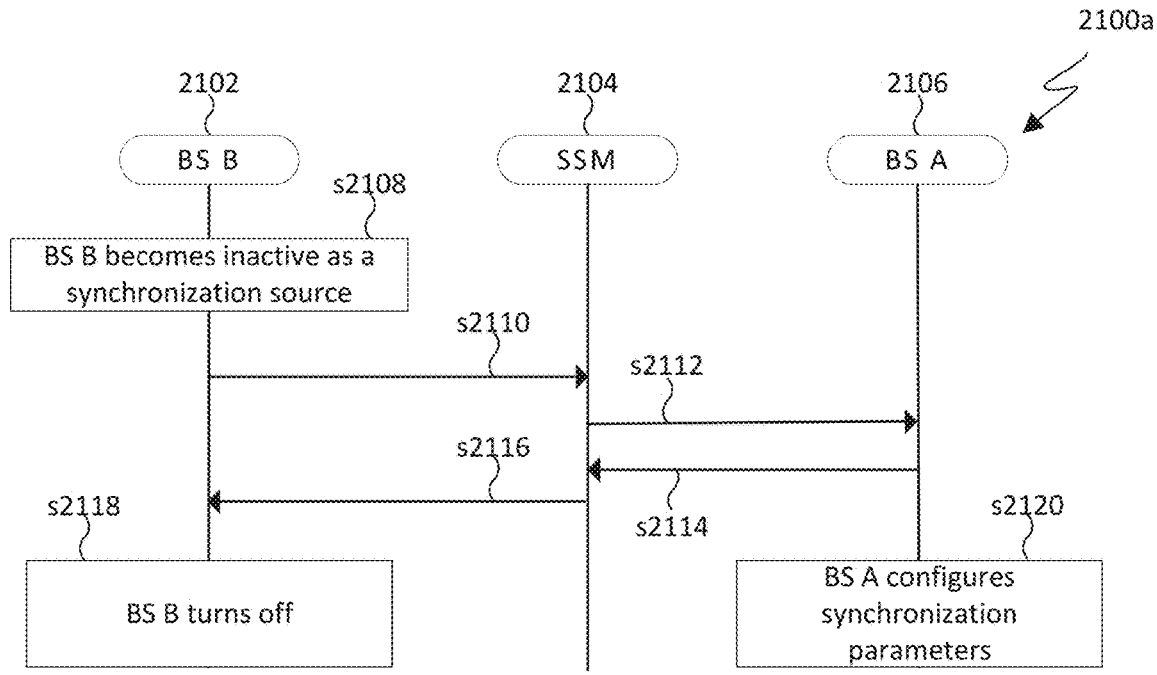
FIG. 21A illustrates a signal flow diagram for managing unavailability of a synchronization source according to various embodiments of this disclosure.

FIG. 21A illustrates a signal flow diagram for managing unavailability of a sync source according to various embodiments of this disclosure. In the signal flow diagram 2100a, BS B 2102, SSM 2104, and BS A 2106 are in a shared spectrum network, such as network 400 in FIG. 4. Further, BS B 2102 is a sync source.

In s2108, BS B 2102 determines that it will be unavailable. For example, BS B 2102 may be scheduled for a planned non-operation (PNO) event. In s2110, BS B 2102 sends an SMR to SSM 2104 with a node unavailable indication to indicate that it will no longer be operating as an active sync source in the shared spectrum network. In s2112, SSM 2104 sends an SMI to BS A 2106 to inform BS A 2106 of updated master/slave assignments. In one embodiment, BS A 2106 is promoted to a synchronization source. In s2114 BS A 2106 sends an acknowledgment back to SSM 2104. Upon receipt of the acknowledgment, SSM 2104 sends an SMI in s2115 to BS B 2102 to release BS B 2102 as a synchronization source. In s2118, BS B 2102 turns off and in s2120 BS A 2106 configures its synchronization parameters using the information contained in the SMI transmitted in s2112.

Figure 21B:
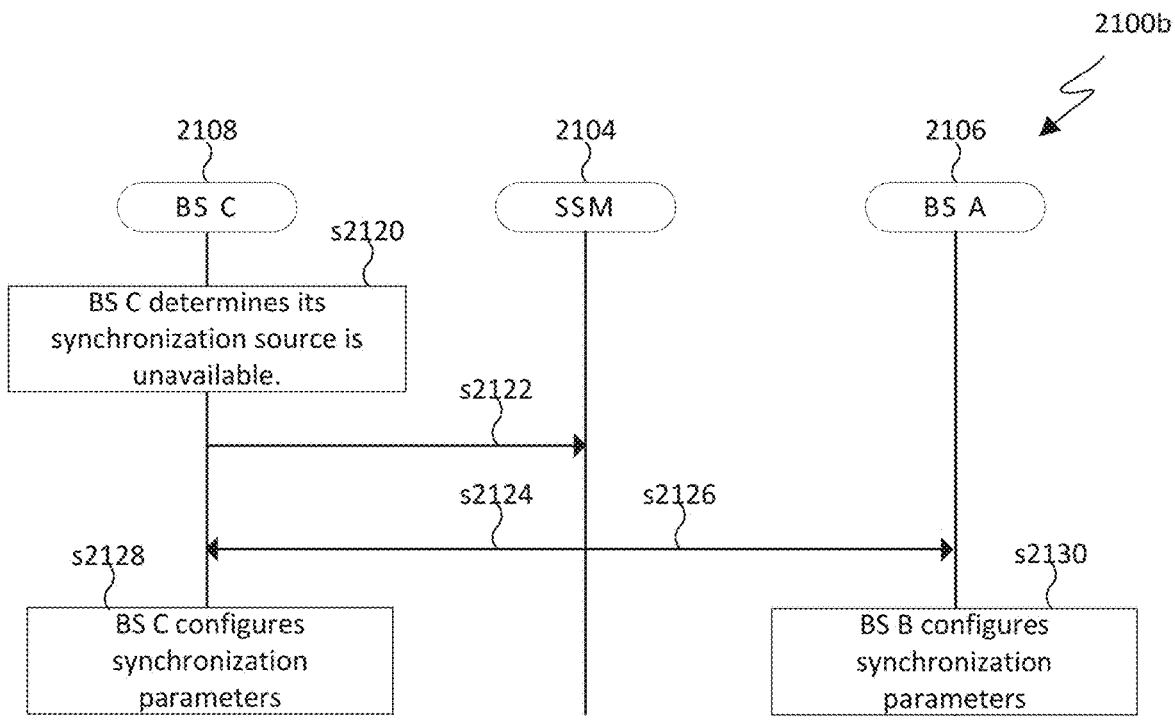
FIG. 21B illustrates another signal flow diagram for managing unavailability of a synchronization source according to various embodiments of this disclosure.

FIG. 21B illustrates another signal flow diagram for managing unavailability of a sync source according to various embodiments of this disclosure. In the signal flow diagram 2100b, SSM 2104, BS A 2106, and BS C 2108 are in a shared spectrum network, such as network 400 in FIG. 4. Further, BS C 2108 is a slave BS that determined that its sync source has become unavailable.

In s2120, BS C 2108 determines that its synchronization source is unavailable. For example, BS C 2108 may monitor the OSS of a neighboring sync source, e.g. BS B, and determine whether the sync source is no longer available as a sync source, possibly due to the BS becoming inactive, experiencing a fault or failure, variation in the wireless channel impacting OSS signal reception, or other factors.

In s2122, BS C 2108 transmits an SMR to SSM 2104 indicating that its sync source is no longer available. In s2124, SSM 2104 sends an SMI to BS C 2108 to inform BS C 2108 of updated master/slave assignments. The SSM 2104 also sends an SMI to BS A 2106 to inform BS A 2106 of the updated master/slave assignments. In s2116, BS C 2108 configures its synchronization parameters based on the received SMI, and in s2130, BS A 2106 configures its synchronization parameters based on the received SMI.

Example Options for Synchronization Source Assignment

Although the criteria for assigning a synchronization source to a BS may be left up to implementation, several possible approaches or policies may be considered. In one embodiment of centralized synchronization assignment, the SSM may designate a neighboring synchronization source at the lowest stratum, or the lowest stratum within the same MNO network or PLMN, as the master for a new BS. Although other policies are possible, the SSM may assign a BS to a master at the lowest available stratum may achieve the lowest timing error since, as mentioned, timing error may be propagated through successive hops of intermediate OTA synchronization sources. If multiple synchronization sources at the same stratum are neighbors of the new BS, the SSM may indicate in an SMI that the BS should take the average of the timing derived from these synchronization sources in order to reduce the timing error for both neighboring nodes. In another embodiment, the SSM may indicate that the BS should take the weighted average of the timing derived from multiple neighboring synchronization sources, which may be at different stratums. In this embodiment, the weight applied to the timing derived from each synchronization source may be a function of the respective stratum where, for example, timing from a lower stratum would receive a higher weight since the error from the root timing reference may be less.

Figure 22:
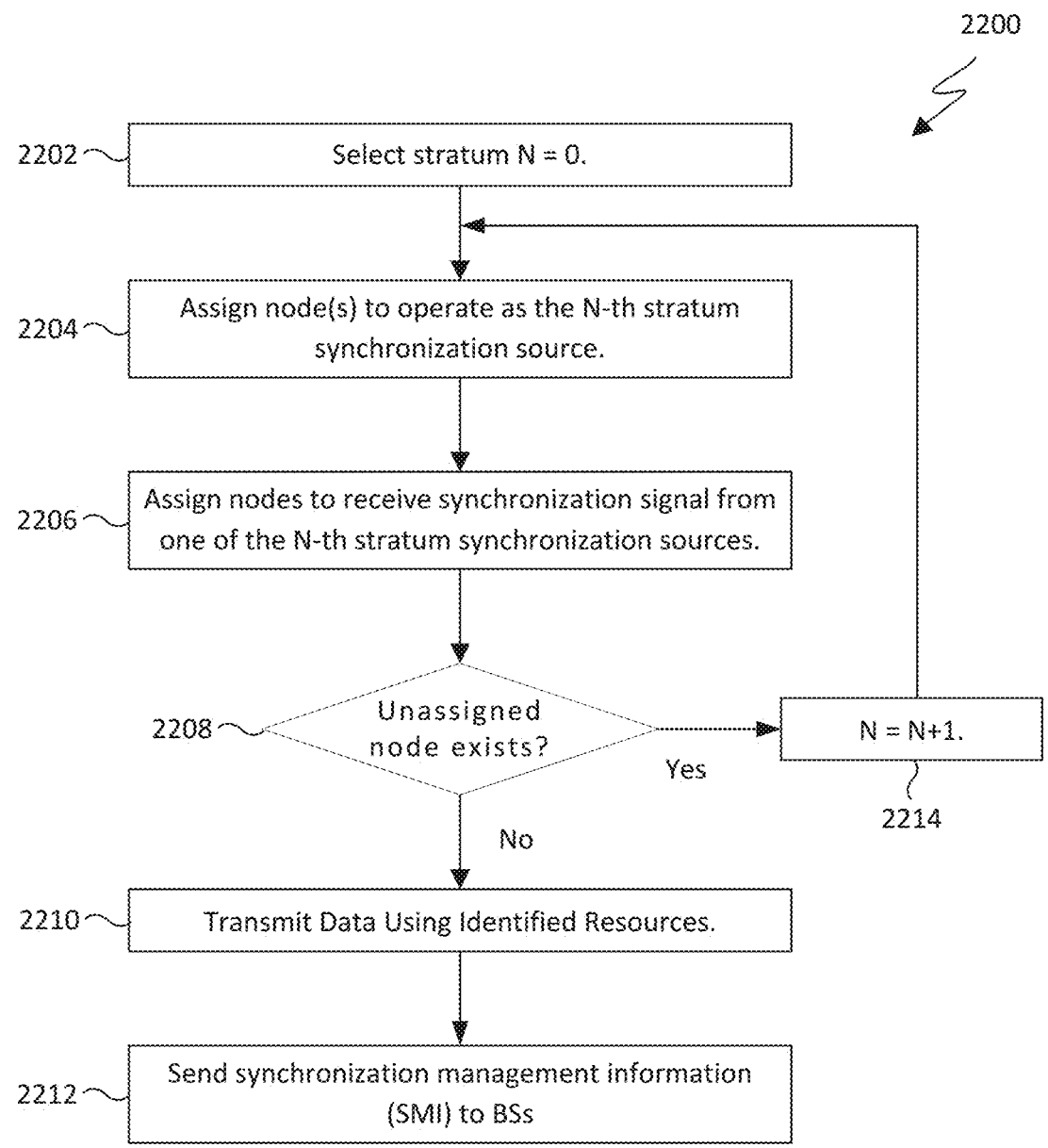
FIG. 22 illustrates a flowchart for multi-stratum assignment of synchronization sources and slave BSs according to various embodiments of this disclosure.

FIG. 22 illustrates a flowchart for multi-stratum assignment of sync sources and slave BSs according to various embodiments of this disclosure. The operations of flowchart 2200 can be implemented in an SSM, such as SSM 406 in FIG. 4.

Flowchart 2200 begins at operation 2202 by selecting stratum N equal to zero. In operation 2204, one or more nodes are assigned to operate as sync sources in the Nth stratum. In operation 2206, one or more nodes are assigned to receive sync signals from the one or more sync nodes in the Nth stratum.

In operation 2208 a determination is made as to whether an unassigned node still exists. If an unassigned node still exists, then flowchart 2200 proceeds to operation 2214 where the stratum is incremented by 1, i.e., N=N+1, before returning to operation 2204. However, if a determination is made in operation 2208 that an unassigned node does not exist, then flowchart 2200 proceeds to operation 2210 where data is transmitted using the identified resources. In operation 2212, SMI is sent to the BSs indicating that the BSs may need to update their synchronization source assignments and/or configuration.

Furthermore, the addition or removal of a BS node from the shared spectrum network topology may result in synchronization source reassignment by the SSM for one or more BS nodes. Addition and removal of BSs are described in more detail in the interference graphs shown in FIG. 23 and FIG. 24.

Figure 23A:
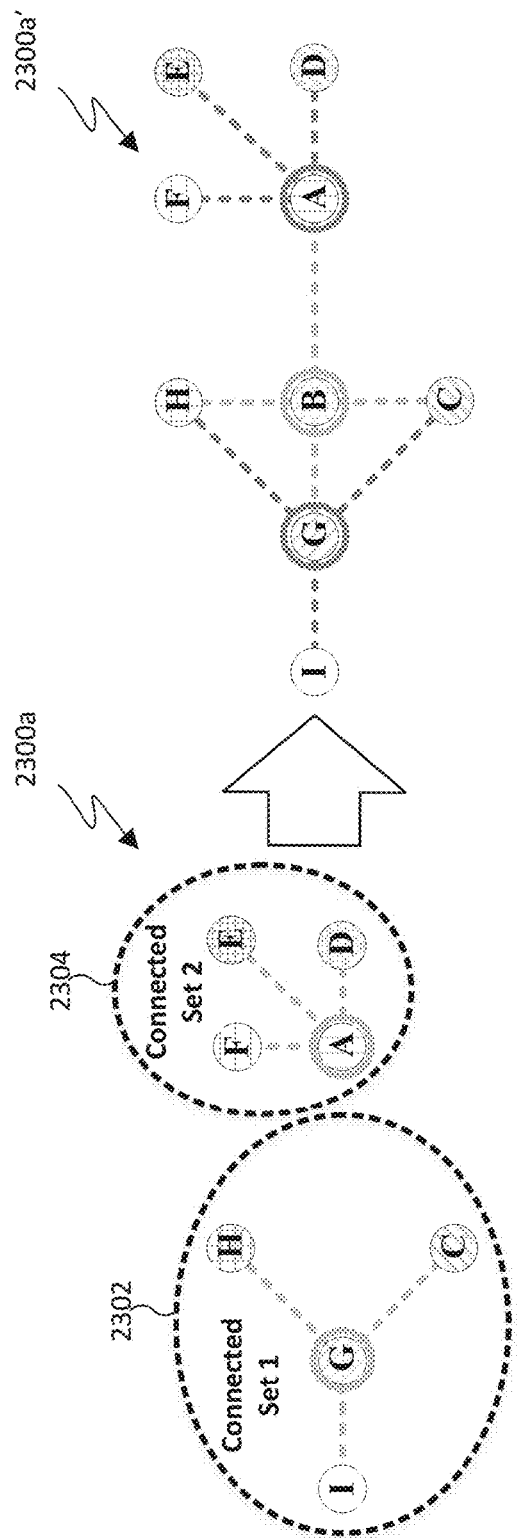
FIG. 23A illustrates an interference graph depicting reassignment of BS nodes after a BS joins an established shared spectrum network according to various embodiments of this disclosure.

FIG. 23A illustrates an interference graph depicting reassignment of BS nodes after a BS joins an established shared spectrum network according to various embodiments of this disclosure. The BSs in the network 2300a are initially separated into two separate connected sets, connected set 1 2302 and connected set 2 2304.

The addition of a new BS node, e.g., BS node B, having an interference relationship with nodes from both connected set 1 2302 and connected set 2 2304 would cause the two independent connected sets to become joined into one connected set. For example, if BS node B has interference relationships with BS nodes C, G and H from connected set 1, and BS node A form connected set 2, then an SSM can reconfigure the shared spectrum network into a single connected set as shown in network 2300a'.

In network 2300a, each connected set 2302 and 2304 has a different root synchronization source and may have considerably different CSS frame timing. In this situation, an SSM may reassign synchronization sources so that, as an example, BS node B becomes the root synchronization source and A and G become slaves to B, thus being demoted to stratum 1 nodes. BS nodes A, G or both may need to update their frame timing according to the timing of BS node B. Although slave nodes of A and G still remain slaves to the same synchronization sources, they may also be required to update their coarse timing as a result. Alternatively, the SSM may assign either BS nodes A or G as the master to the new BS node B, possibly based on the estimated interference BS node B would cause to the other connected set if it were not synchronized. Further elaborating on this example, BS node B may only weakly interfere with A and vice versa, whereas it causes significant interference to BS nodes C, G and H. In this case, the SSM may determine that BS node B should be assigned to BS node G as its master synchronization source, thus avoiding the reconfiguration and resynchronization of multiple nodes from both connected sets.

In one example, BS node G is the synchronization source for connected set 1 2302 and BS node A is the synchronization source for connected set 2 2304. BS node B becomes newly active in network 2300*a* and begins a signal exchange with an SSM (not shown). An example of the signal exchange between BS node B and the SSM is shown in signal flow diagram 1800 in FIG. 18. Although not shown in FIG. 18, the signals exchanged between SSM 1804 and BS A 1806 would also be transmitted between the SSM 1804 and the various BS nodes affected by the addition of BS node B, e.g., BS nodes C, G, and H.

Figure 23B:
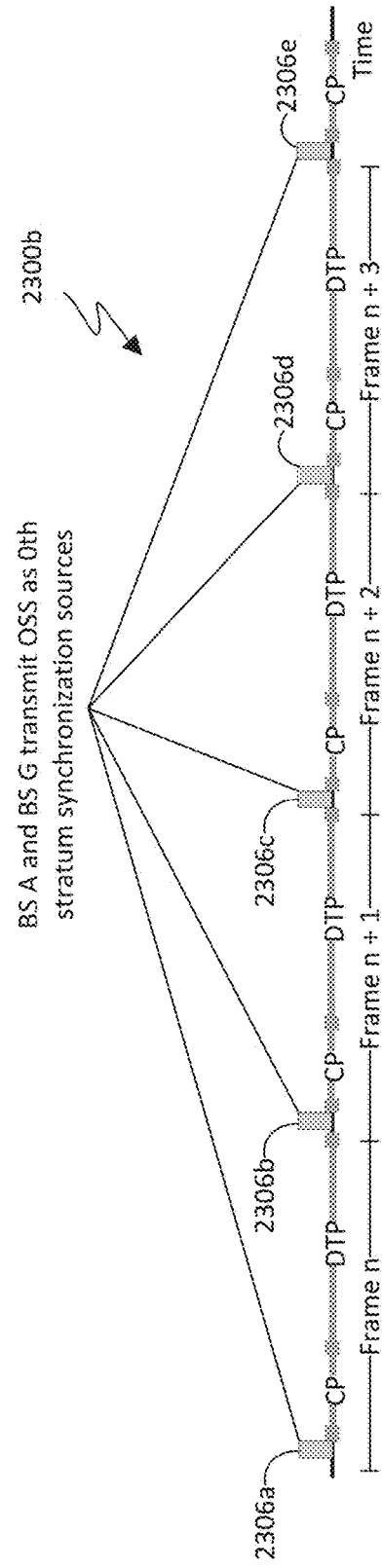
FIGS. 23B and 23C illustrate transmission frames for OSS assignment before and after a BS joins an established shared spectrum network according to various embodiments of this disclosure.

FIG. 23B illustrates transmission frames for network 2300*a* before BS node B becomes active. Because BS nodes A and G are in separate connected sets, they can both transmit OSS as 0th stratum synchronization sources in OSS transmission periods 2306*a*, 2306*b*, 2306*c*, 2306*d*, and 2306*e*.

Figure 23C:
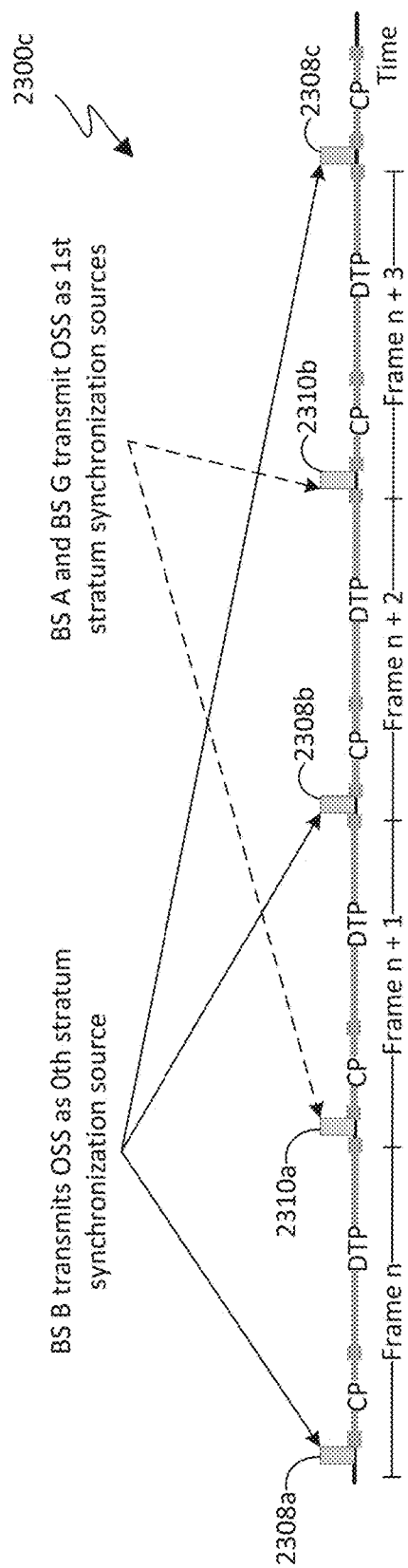

FIG. 23C illustrates transmission frames for network 2300*a'* after BS node B becomes active. In this example, BS node B is assigned as a synchronization source BS of network 2300*a'* and transmits in OSS transmission period 2308*a* and 2308*b* as a 0th stratum synchronization source. BS nodes A and G are reassigned as 1st stratum synchronization sources that derive their transmission timing from BS node B. In particular, BS nodes A and G transmit OSS in OSS transmission periods 2310*a* and 2310*b* using spatial reuse.

Figure 24A:
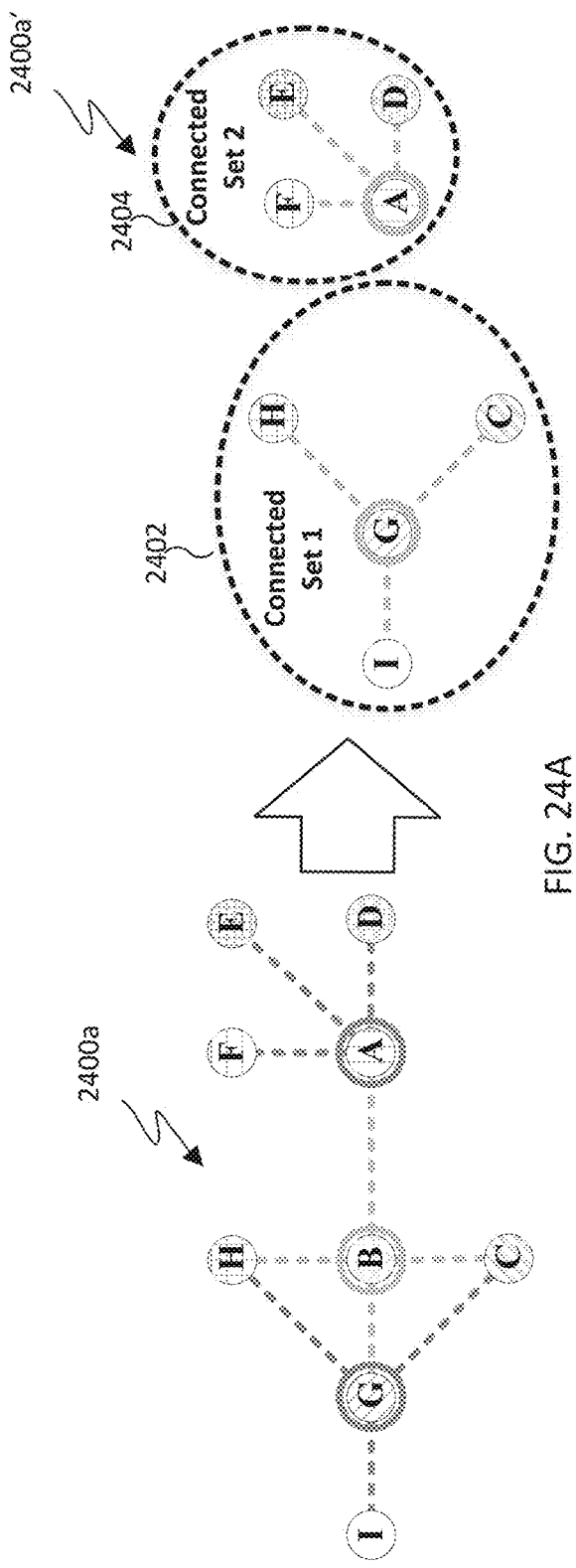
FIG. 24A illustrates an interference graph depicting reassignment of BS nodes before and after a BS of an established shared spectrum network becomes unavailable according to various embodiments of this disclosure.

FIG. 24A illustrates an interference graph depicting reassignment of BS nodes after a BS of an established shared spectrum network becomes unavailable according to various embodiments of this disclosure. In this example, BS node B is the root synchronization source for its connected set in network 2400*a* but may experience some hardware fault or failure, which results in BS node B no longer being an operating synchronization source. BS B may then send a node unavailable message to the SSM to indicate it is no longer operational. The SSM can then segment the unified connected set into connected set 1 2402 and connected set 2 2404 in a reconfigured network 2400*a'*. The SSM can assign new sync sources for each connected set. For example, BS node G can be assigned as the sync source for connected set 1 2402 and BS node A can be assigned the sync source for connected set 2 2404. The nodes of each newly-formed connected set may also need to update their frame timing accordingly.

An example of the signal flow between the BS node B and the SSM for notifying the SSM of a scheduled unavailability, such as a PNO event, is discussed in more detail in FIG. 21A. Although not shown, BS node G would also exchange similar signals with SSM 2104 that is exchanged between SSM 2104 and BS A 2106 in FIG. 21A.

Figure 24B:
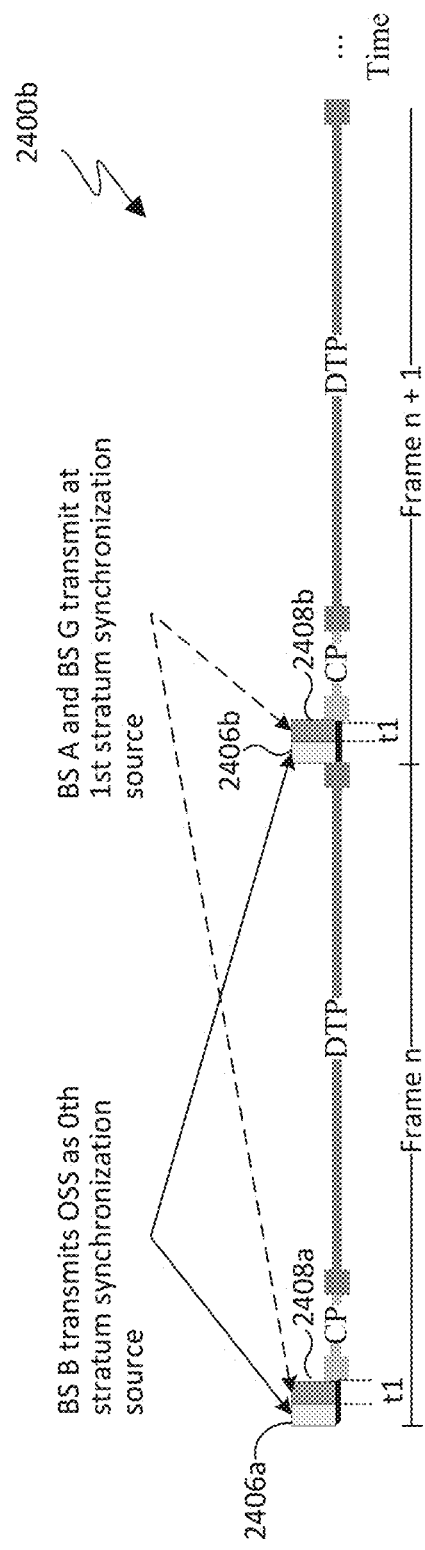
FIGS. 24B and 24C illustrate transmission frames for OSS assignment after a BS becomes unavailable in a shared spectrum network according to various embodiments of this disclosure.

FIG. 24B illustrates transmission frames 2400*b* for network 2400*a* before BS node B becomes unavailable. As the synchronization source BS for the network 2400*a*, BS node B transmits OSS in OSS periods 2406*a* and 2406*b*. BS nodes A and G are slaves to BS node B, but are 1st stratum synchronization sources to one or more slave BSs. Accordingly, BS nodes A and G transmit OSS in OSS periods 2408*a* and 2408*b* using spatial reuse.

Figure 24C:
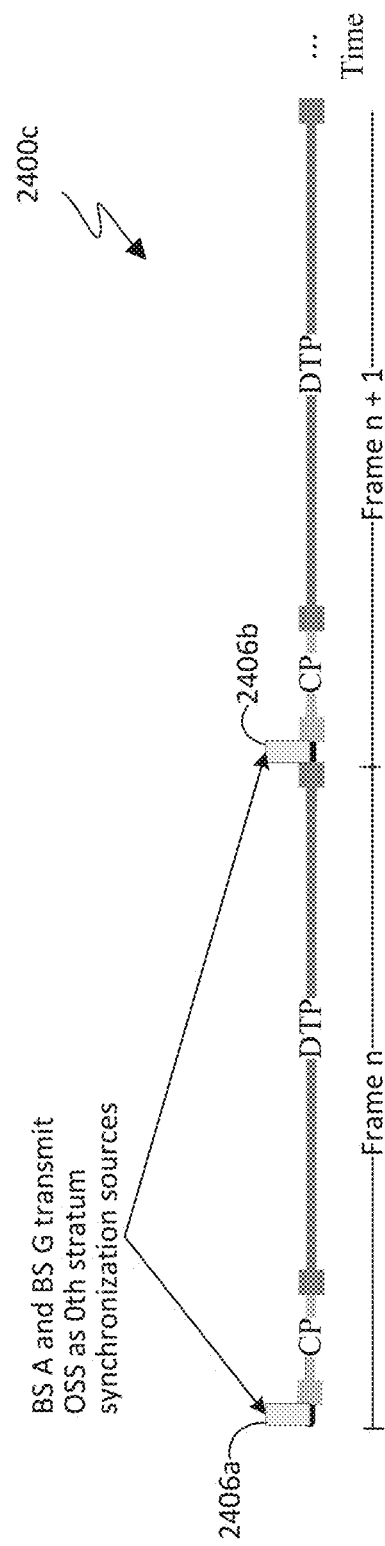

FIG. 24C illustrates transmission frames 2400*c* for a network 2400*a'* after BS node B becomes unavailable. BS nodes A and G are reassigned as 0th stratum synchronization sources in their respective isolated connected set. As previously discussed, BS nodes A and G transmit OSS in OSS transmission periods 2406*a* and 2406*b* using spatial reuse.

Upon decrease of the supported synchronization source levels, from two to one in this illustrative example in FIG. 24, the OSS transmission period can be reduced. The period between two consecutive OSS from one synchronization source can be variable. There can be several period options that a synchronization slave node BS can assume for hypothesis testing.

Figure 25:
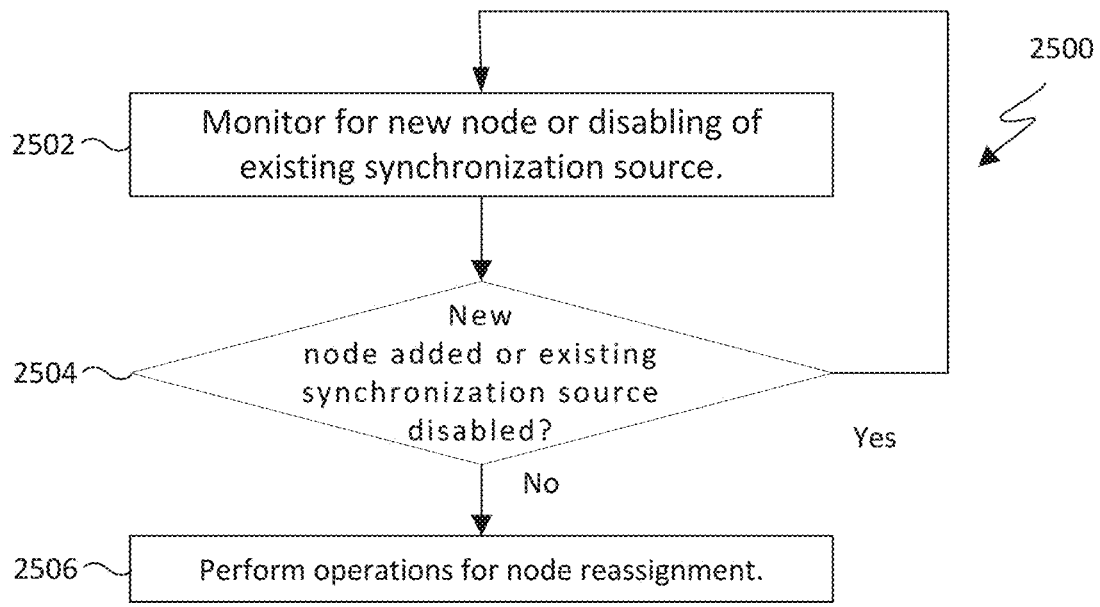
FIG. 25 illustrates a flowchart for reassigning BSs in a shared spectrum network according to various embodiments of this disclosure.

FIG. 25 illustrates a flowchart for reassigning BSs in a shared spectrum network according to various embodiments of this disclosure. Operations in flowchart 2500 can be implemented in an SSM, such as SSM 406 in FIG. 4.

Flowchart 2500 begins at operation 2502 where monitoring is performed for a new node or disabling or an existing sync source. In operation 2504, a determination is made as to whether a new node is added, or an existing sync source has been disabled. If no new node has been added or no existing sync source has been disabled, then flowchart 2500 returns to operation 2502. However, if a new node has been added or an existing sync source node has been disabled, then flowchart 2500 proceeds to operation 2504 to operation 2506 and implements operations for node reassignment. One non-limiting embodiment of a flowchart for node reassignment is described in FIG. 22 above.

Synchronization Measurement Reports

SMR messages may be sent over the backhaul from a BS to the SSM, as shown in FIG. 17. The SMRs can include any one or more of the following information elements.

A request for synchronization information. The request for synchronization information is an explicit request submitted to the SSM. This request can prompt the SSM to send an SMI with the requested information to the sending BS. Requested information may include a synchronization source assignment request, or any one or more SMI information elements described in more detail in the section that follows.

System information update of sending BSs. A system information update for sending BSs can include the BS's own ID (PCI, ECGI or some other identifier), MNO network or PLMN ID, and/or an indication of the type of device, e.g. a mobile relay or other low-power device. The system information may also include an indication that the BS allows itself to be designated as a synchronization source by the SSM, that the BS indicates sync sources of same MNO network or PLMN required/preferred and/or the availability of absolute timing source and/or type of absolute timing source, e.g. GPS or PTP (IEEE 1588), at the BS.

Neighbor information. The neighbor information can include a list of neighbors whose OSS signals have been discovered, including the neighbor BS ID (e.g. PCI, ECGI or some other identifier) detected by the BS sending the SMR (e.g., from the neighbor's OSS or MIB/SIB), an indicator of the stratum of discovered neighbors and/or an indication of the availability of an absolute timing source (e.g. GPS or PTP) at the neighbors (e.g., detected from the neighbor's OSS or MIB/SIB). An indicator of the neighbors' signal power or quality, e.g. in terms of RSRP, RSRQ, or RSSI measurements, may also be included, and may be, for example, represented in dB, Watts or any derived unit, and transmitted as an average or quantized version, or some other representation of these measurements.

Unavailability indicator. The unavailability indicator is a notification that the BS will be discontinuing operation as a synchronization source. The node unavailable indication may also refer to neighboring BSs and include a list of elements indicating whether known neighboring synchronization sources are unable to be detected, or are received with low power, by the BS sending the SMR.

Synchronization Management Indications

SMI messages may be sent over the backhaul from an SSM to a BS, as shown in FIG. 17. The SMIs can be used to indicate configuration updates or other information to the BS. The SMIs can include any one or more of the following information elements.

Request for system and neighbor information. The request for system and neighbor information can prompt the BS receiving the SMI to send, in a subsequent SMR, its system information or neighbor information updates, or any of the information in the above section describing SMR messages.

Neighbor discovery information about neighboring (geographically local) synchronization sources of the receiving BS. The information can include BS IDs (e.g. PCI, ECGI, etc.), some other index or identifier to indicate the OSS training sequence transmitted by each neighbor, the network (e.g. PLMN) ID of each neighbor, an indicator of the neighbors' synchronization stratum, and/or an indication of the availability of absolute timing sources (e.g. GPS or PTP) at the neighbors. The duty cycle or time/frequency resource mapping of the OSS may also be included, which may be encoded in various formats such as a simple index to a look-up table of time/frequency resource indices or the start and end indices of the time/frequency resources. The ideal/absolute frame timing of the respective connected set may also be included, which could be represented in some standardized format, e.g. Coordinated Universal Time (UTC) time, or abbreviated to some shorter format that may be used to establish the frame timing given an absolute timing reference, e.g. some millisecond offset within a window of a second to indicate the frame begins at that precise millisecond relative to some fixed timestamp.

The master synchronization source assignment for the BS receiving the SMI. This information can include the BS ID or some sequence ID used to identify an OSS training sequence transmitted by the synchronization source. Secondary and tertiary synchronization source assignments may also be included, which may be used by the BS in case the primary sync source becomes unavailable. The assignment may also include information about the configuration of the synchronization source, such as the random access channel resources, RACH preamble, or other physical channel information that may be used by the receiving BS for communicating with the synchronization source, for example, for acquiring the timing advance.

Synchronization source configuration for the recipient BS, in the case that the SSM has assigned it to be a synchronization source. This information may include the PCI or OSS training sequence index to use, time/frequency resource mapping and/or duty cycle for OSS transmission, which may be encoded as described above. The power for transmitting the OSS may also be included and represented in dB, Watts or any derived unit and also as quantized formats. The SMI may also include an indication of RACH resource and/or preamble and/or other physical channel resources to reserve for communications from one or more other BSs, which may also be indicated as described above.

Figure 26A:
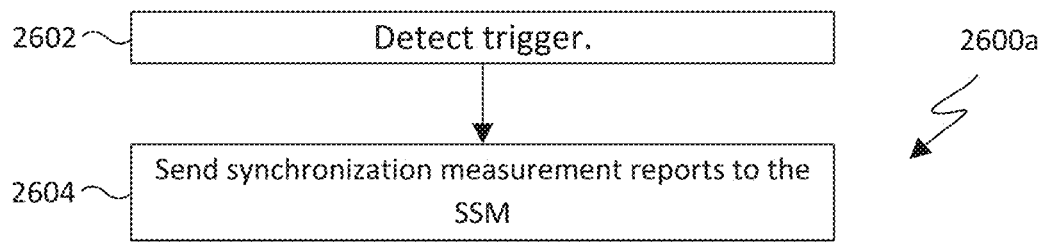
FIG. 26A illustrates a flowchart for transmitting SMRs according to various embodiments of this disclosure.

FIG. 26A illustrates a flowchart for transmitting SMRs according to various embodiments of this disclosure. Operations of flowchart 2600a can be implemented in a BS, such as BS 200 in FIG. 2.

Flowchart 2600a begins at operation 2602 by detecting a trigger. The trigger can be a periodic trigger or an aperiodic trigger. In operation 2604, an SMR is sent to an SSM.

Figure 26B:
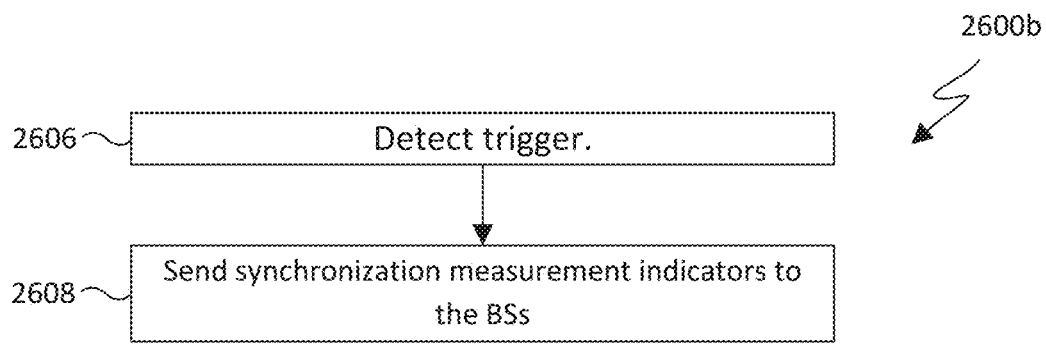
FIG. 26B illustrates a flowchart for transmitting SMIs according to various embodiments of this disclosure.

FIG. 26B illustrates a flowchart for transmitting SMIs according to various embodiments of this disclosure. Operations of flowchart 2600b can be implemented in an SSM, such as SSM 406 in FIG. 4.

Flowchart 2600b begins at operation 2606 by detecting a trigger. The trigger can be periodic or aperiodic. In operation 2608, SMIs are sent to the BSs.

Figure 27A:
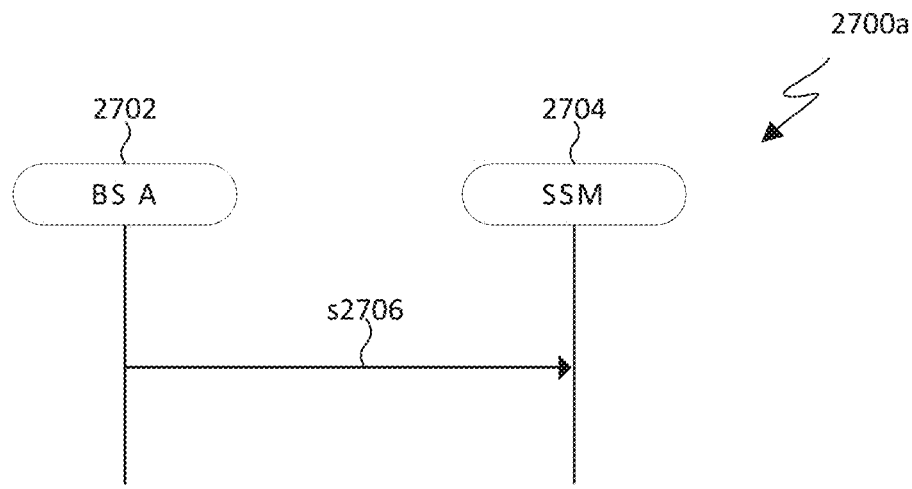
FIG. 27A illustrates a signal flow diagram for transmitting SMRs according to various embodiments of this disclosure.

FIG. 27A illustrates a signal flow diagram for transmitting SMRs according to various embodiments of this disclosure. BS A 2702 and SSM 2704 are in a shared spectrum network, such as network 400 in FIG. 4. BS a 2702 transmits an SMR to the SSM 2404 in s2706. The SMR can be transmitted in response to detecting a triggering event as described in previous embodiments.

Figure 27B:
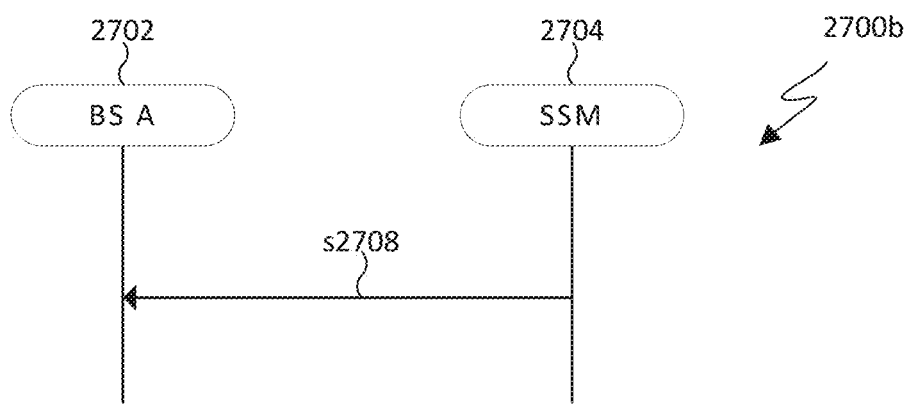
FIG. 27B illustrates a signal flow diagram for transmitting SMIs according to various embodiments of this disclosure.

FIG. 27B illustrates a signal flow diagram for transmitting SMIs according to various embodiments of this disclosure. BS A 2702 and SSM 2704 are in a shared spectrum network, such as network 400 in FIG. 4. SSM 2704 transmits an SMI to the BS A 2402 in s2708. The SMI can be transmitted in response to detecting a triggering event as described in previous embodiments.

Distributed New BS Synchronization Source Discovery and Association

Figure 28:
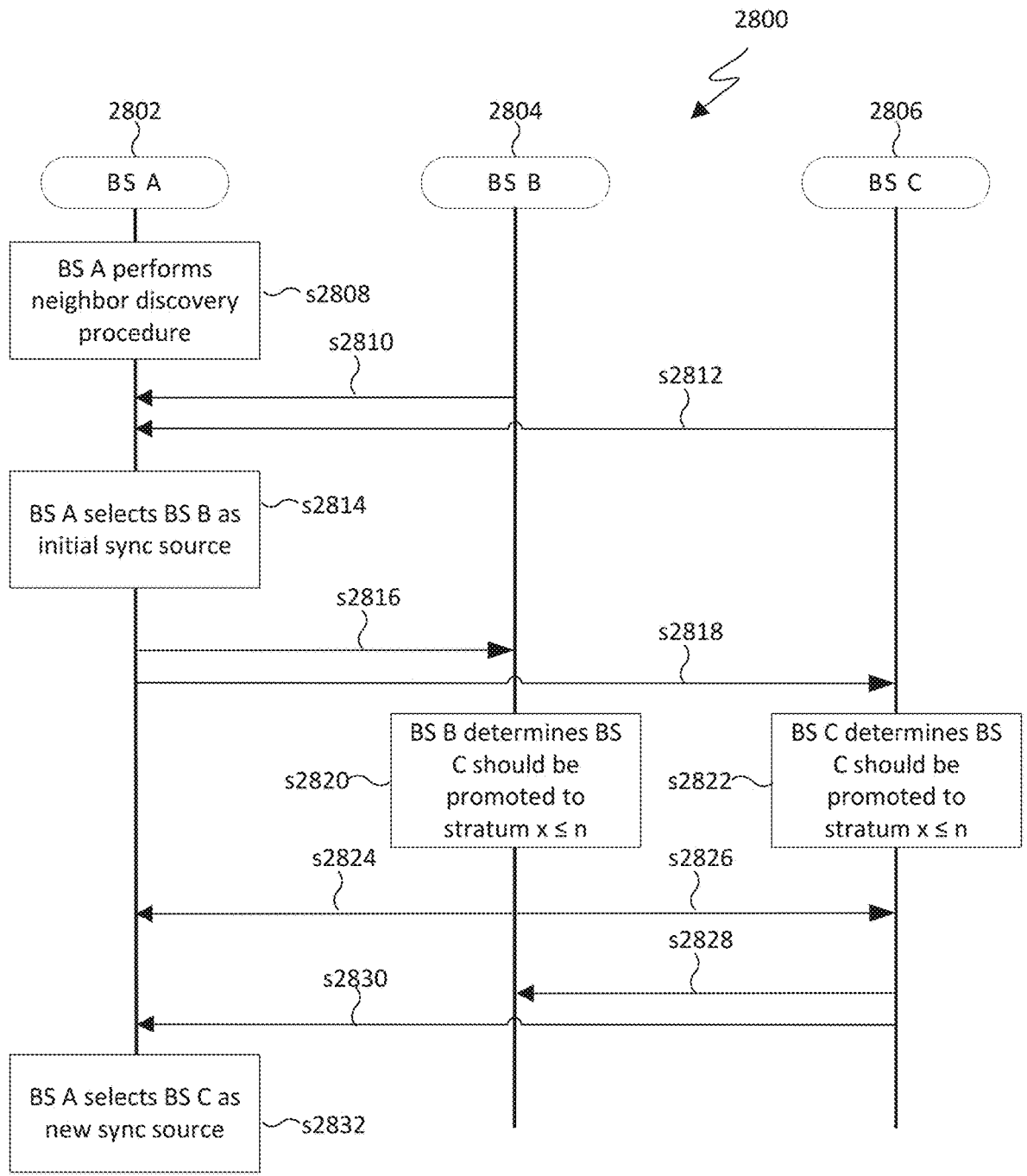
FIG. 28 illustrates a signal flow diagram for adding a BS in a decentralized shared spectrum network according to various embodiments of this disclosure.

In the disclosed distributed BS synchronization source discovery and association procedure, shown in FIG. 28, BSs that are newly installed, or become active after some period of inactivity, discover neighboring synchronization sources and associate with a synchronization master without the assistance of a centralized entity such as the SSM. FIG. 28 shows a non-limiting example of the distributed communication and coordination between BSs sharing a spectrum to mutually determine master/slave synchronization source relationships. Any of the operations from the procedure in FIG. 28 may be omitted or may be performed in an alternate order. Also, the general procedure described here can be applied for fewer or greater than the three BS nodes depicted therein.

FIG. 28 illustrates a signal flow diagram for adding a BS in a decentralized shared spectrum network according to various embodiments of this disclosure. In this example, BS A 2802 is joining BS B 2804 and BS C 2806 in an established shared spectrum network, such as shared spectrum network 600a in FIG. 6A.

In S2808 BS A 2802 performs a neighbor discovery procedure by detecting OSS signals transmitted by neighboring synchronization sources. Additional system information, such as the BS ID, network ID and stratum indicator may be received from the neighbors' OSS or other MIB/SIB signals, as previously discussed.

In s2810, BS B 2804 transmits OSS to BS A 2802 and may also transmit additional system information, including stratum indicator, in either the OSS or MIB/SIB. In s2812, BS C 2806 transmits OSS to BS A 2802 and may also transmit additional system information, including stratum indicator, in either the OSS or MIB/SIB.

In one embodiment, upon detecting one or more synchronization signals, BS A 2802 selects one of the detected neighbors, e.g. B and/or C, as its initial sync source. In this example in FIG. 28, BS A 2802 select BS B 2804 as its initial sync source.

In another embodiment, BS A 2802 may assume the role of sync source and may configure itself to use some default synchronization parameters for transmission of the OSS. This may occur, for example, in the case that no other synchronization sources are detected by BS A 2802.

Returning to FIG. 28, the selection of BS B 2804 as sync source for BS A 2802 may be based on the indicated stratum n of BS B 2804, which may be lower than the stratum m of other neighbors, e.g. BS C 2806, or the decision may be based on other factors such as PLMN ID or received power.

Thereafter, BS A 2802 may transmit a node advertisement, which is an over-the-air signal for conveying information about itself to its neighbors. In particular, BS A 2802 can transmit a node advertisement to BS B 2804 in s2816 and another node advertisement to BS C 2806 in s2818. Node advertisements may be transmitted in the Coordination Phase, shown in FIG. 8, and may include such information as the BS ID of a selected master and/or a list of detected neighbor BS IDs and stratum indicators, among other information elements listed in the following section. Node advertisements may be broadcast to all neighbors or unicast to a specific neighbor.

Upon receiving the node advertisement, neighbors of BS A 2808 may determine, based on some predetermined policy, that their configuration should be updated due to the addition of BS A 2802. For example, BS A 2802 may create interference to multiple BS nodes causing multiple connected sets to be joined, as previously described, which may necessitate the master/slave hierarchy to be recomputed. In this example in s2820, BS B 2804 determines that BS C 2806 will be promoted to a lower stratum x and, and in s2822 BS C 2806 also determines that it will be promoted to a lower stratum x. In some embodiments, BS B 2804 may be demoted, such that the stratum of BS C 2806 is now lower than that of BS B 2804. In other words, the master/slave relationship between BS B 2804 and BS C 2806 may change as a result of BS A 2802 joining the network, which is reflected by the respective strata of BS B 2804 and BS C 2806. BS B 2804 may thus become a slave to BS C 2806.

In s2824, BS B 2804 transmits its node advertisement to BS A 2802 and in s2826 BS B 2804 transmits its node advertisement to BS C 2806. In s2828, BS C 2806 transmits its node advertisement to BS B 2804 and in s2830 BS C 2806 transmits its node advertisement to BS A 2802. The node advertisements transmitted in s2824, s2826, s2828, and s2830 can also include updated stratum information. They may also transmit the updated stratum configuration as part of the OSS or MIB/SIB.

In s2832, BS A can select a new master, e.g. BS C 2806 based on the received node advertisements and/or OSS/MIB/SIB from its neighbors with the updated stratum configuration.

Several iterations of updating the synchronization configuration and sending out node advertisements may be repeat until the master/slave synchronization hierarchy becomes stable and all BSs within the connected set determine no further updates are needed for the given state of the network topology and BS configurations.

Distributed Synchronization Source Reconfiguration

Other types of topology changes resulting, for example, from a sync source becoming unavailable or changing interference relationships, may also trigger a distributed reconfiguration of the master/slave synchronization relationships, which is similar to the centralized synchronization source reconfiguration procedure previously described but takes place without assistance from a centralized SSM.

Figure 29:
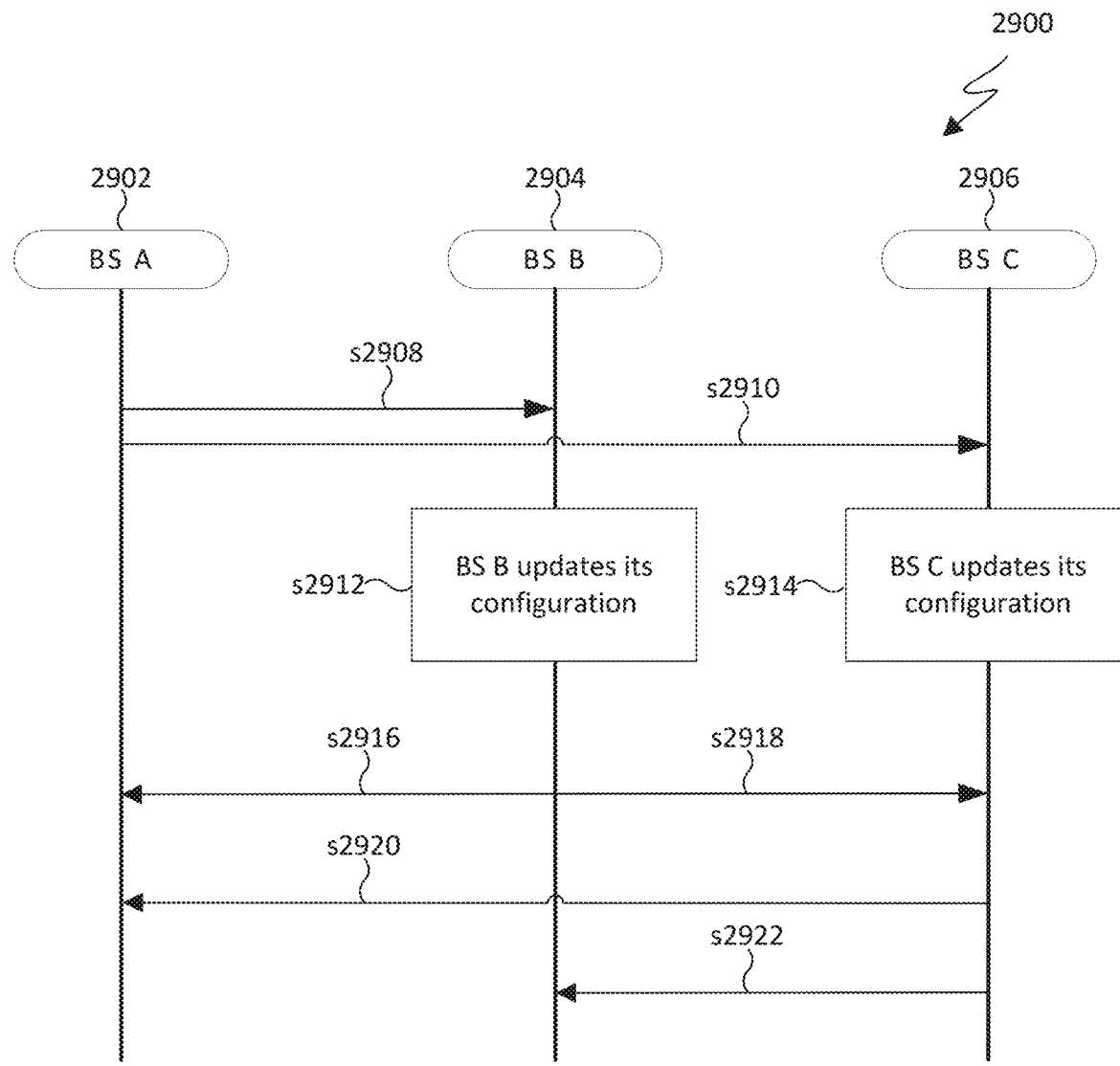
FIG. 29 illustrates a signal flow diagram for removing a BS in a decentralized shared spectrum network according to various embodiments of this disclosure.

FIG. 29 illustrates a signal flow diagram for removing a BS in a decentralized shared spectrum network according to various embodiments of this disclosure. In this example, BS A 2902, BS B 2904, and BS C 2906 are in a distributed, shared spectrum network, such as network 600a in FIG. 6. In addition, BS A 2902 is a sync source to BS B 2904 and BS C 2906 and is informing its neighbor BSs that it will become unavailable.

In s2908, BS A 2902 transmits a node unavailable indication message to BS B 2904 regarding its pending deactivation. In s2910 BS A 2902 also transmits a node unavailable indication message to BS C 2906 regarding its pending deactivation. The node unavailable message may be part of the node advertisement that is transmitted during the coordination phase. Alternatively, the node unavailable message may be a unicast inter-BS control message transmitted directly to one or more BSs using their respective uplink channel resources. Other embodiments, instead of BS A 2902 notifying its neighbors that it will become unavailable in a node unavailable indication message, its neighbors may determine that BS A 2902, their respective sync source, is no longer transmitting an OSS and is therefore unavailable as a sync source.

In s2912, BS B 2904 updates its configuration in response to receiving the node unavailable indication message in s2908. Similarly, in s2914 BS C 2906 updates its configuration in response to receiving the node unavailable indication message in s2910. In s2916, BS B 2904 sends an updated node advertisement to BS A 2902 and in s2918, BS B 2904 sends an updated node advertisement to BS C 2906. In s2920, BS C 2906 sends an updated node advertisement to BS A 2902 and in s2922, BS C 2906 sends an updated node advertisement to BS B 2904.

Several iterations of updating the synchronization configuration and sending out node advertisements may repeat until the master/slave synchronization hierarchy becomes stable and all BSs within the connected set determine no further updates are needed for the given state of the network topology and BS configurations.

Inter-BS Synchronization Information Request and Response and Timing Advance

Following the initial synchronization source discovery and association procedures, for which the centralized embodiment is shown in FIG. 18 and the distributed embodiment is shown in FIG. 28, or at any time following the initial association, a BS may communicate with another BS to exchange information for synchronization purposes. FIGS. 16A and 16B show the exchange of an inter-BS information request and response between two BSs in a shared spectrum network. One non-limiting example in which such communication may be useful is for the acquisition of the timing advance by a synchronization slave from its synchronization master. The timing advance may be useful for performing further fine timing alignment by a synchronization slave.

Figure 30:
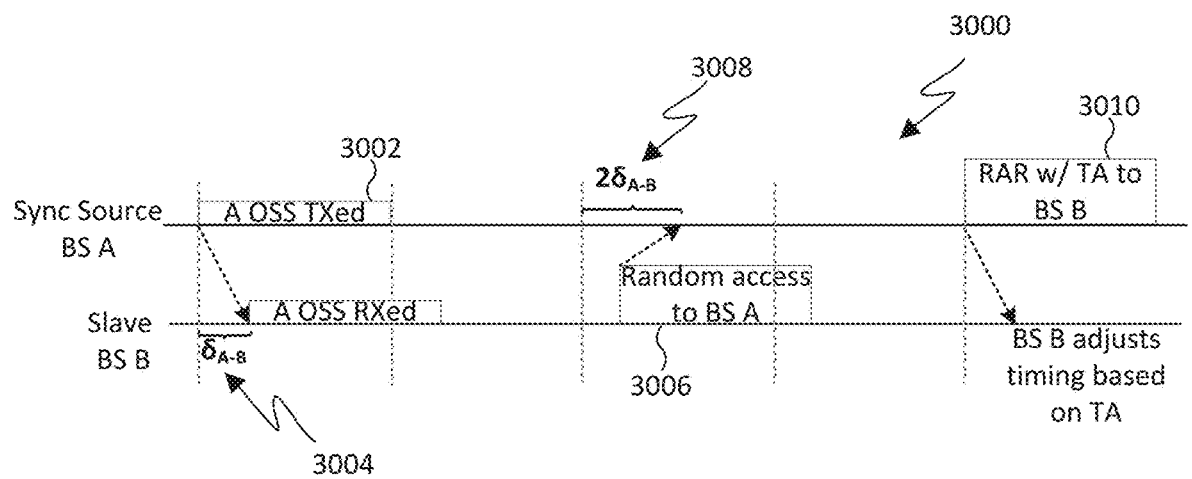
FIG. 30 illustrates timing alignment between a synchronization source BS and a slave BS according to various embodiments of this disclosure.

FIG. 30 illustrates timing alignment between a sync source and a slave BS according to various embodiments of this disclosure. The timing alignment can be achieved between base stations of a shared spectrum network, such as network 400 in FIG. 4, or network 600a in FIG. 6A.

As exemplified in FIG. 30, the OSS 3002 transmitted by a synchronization source BS A may not be sufficient to align the transmission times of CSS frames with high accuracy. The propagation of the OSS 3002 over some distance between BS A and a BS B receiving the OSS 3002 of BS A will result in the OSS 3002 being received at a delay $\delta_{A\text{-}B}$ 3004 after the time it was transmitted. Thus, if BS B bases its frame timing on the time it receives the OSS 3002, the frame timing will be delayed compared to other synchronized BSs within same connected set. To compensate for this propagation delay, BS B may perform the inter-BS information request procedure, which is described in FIG. 31. This procedure could entail sending a random access signal 3006 to BS A. This random access signal 3006 may be similar to the RACH preamble in LTE. However, instead of facilitating random access by a UE, it is used for fine time synchronization between BSs, such as BS A and BS B. The random access signal 3006 will be received at BS A with an offset of roughly $2\delta_{A-B}$ 3008 from the proper frame timing, assuming the propagation from BS A to BS B and BS B to BS A is roughly uniform. From this, BS A can compute the timing advance (TA) to be applied by BS B. The random access signal 3006 may be followed by a random access response (RAR) signal 3010 from the sync source BS A, which may contain TA information. The TA may be represented similar to the LTE TA as the number of samples to be offset from the coarse timing derived from the OSS or may be represented as a time value.

Inter-BS information request/response messages may also be used to send additional synchronization control information between BSs. For example, an explicit indication for a BS to change its synchronization master to a different BS. Such inter-BS information can apply to both centralized and distributed procedures previously disclosed.

Figure 31:
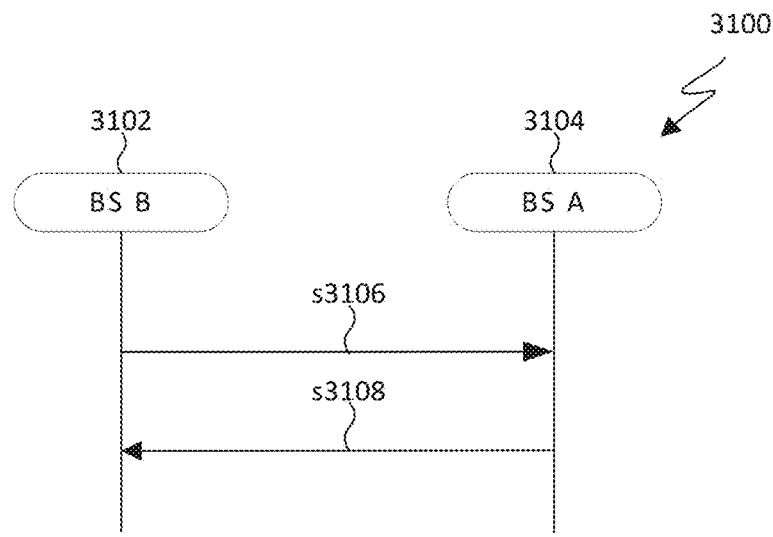
FIG. 31 illustrates a signal flow diagram for timing alignment between a synchronization source BS and a slave BS according to various embodiments of this disclosure.

FIG. 31 illustrates a signal flow diagram for timing alignment between a sync source and a slave BS according to various embodiments of this disclosure. BS B 3102 and BS A 3104 are in a distributed, shared spectrum network, such as network 400 in FIG. 4 or network 600a in FIG. 6. In addition, BS A 3104 is a sync source to BS B 3102.

In s3106 BS B 3102 sends a random access signal to BS A 3104. An example of this random access signal is random access signal 3006 in FIG. 30. In s3108, BS A 3104 transmits a random access response (RAR) to BS B 3102. The RAR can include a timing advance usable to configure BS B 3102. An example of this RAR is RAR 3010 in FIG. 30.

Figure 32:
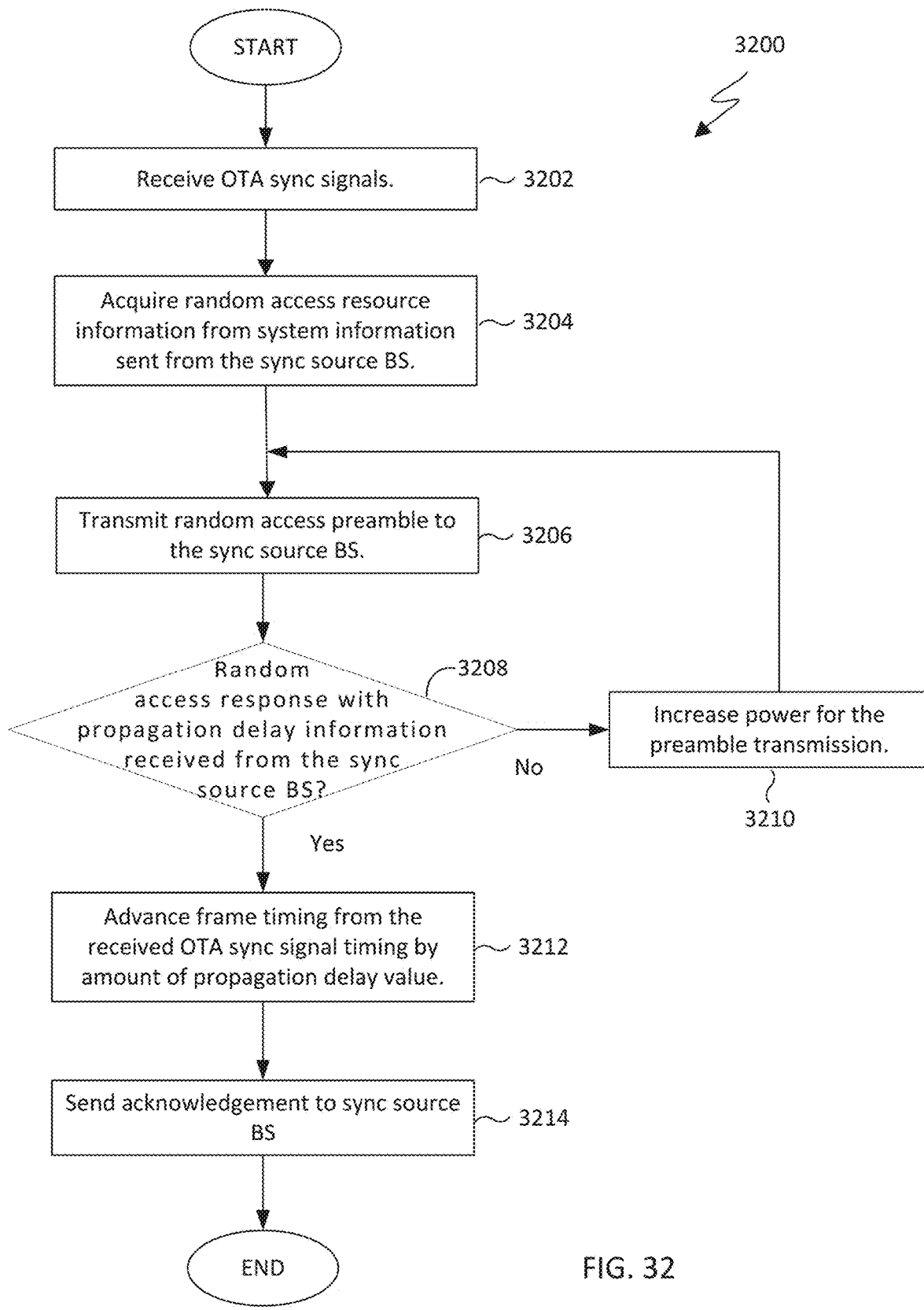
FIG. 32 illustrates a flowchart for timing alignment at a slave BS according to various embodiments of this disclosure.

FIG. 32 illustrates a flowchart for timing alignment at a slave BS according to various embodiments of this disclosure. Operations of flowchart 3200 can be implemented in a BS, such as BS 200 in FIG. 2.

Flowchart 3200 begins at operation 3202 by receiving OSS from a neighbor sync source BS. In operation 3204, random access resource information is acquired from the system information sent from the sync source BS. In operation 3206, a random access preamble is transmitted to the sync source BS.

In operation 3208, a determination is made as to whether a random access response (RAR) with propagation delay information is received from a neighboring sync source BS. If the RAR with propagation delay information is not received from the sync source BS, then flowchart 3200 proceeds from operation 3208 to operation 3210 where power for the preamble transmission is increased. Flowchart 3200 then proceeds from operation 3210 back to operation 3206.

Returning to operation 3208, if the determination is made that the RAR with propagation delay information is received from the sync source BS, then flowchart 3200 proceeds to operation 3212 where the frame timing from the received OSS timing is advanced by the amount of the propagation delay value. In operation 3214, an acknowledgment is sent to the sync source BS.

Figure 33:
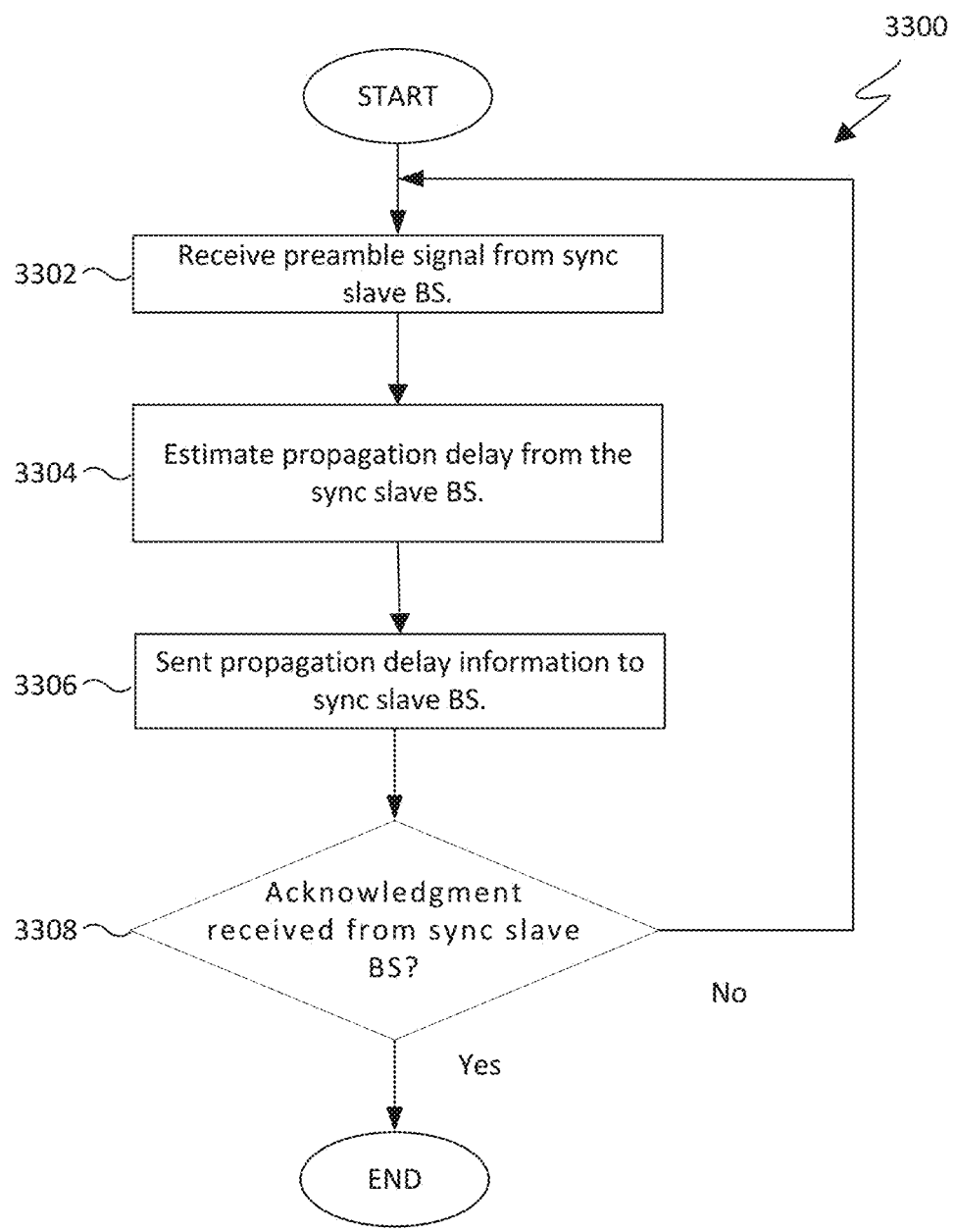
FIG. 33 illustrates a flowchart for timing alignment at a synchronization source according to various embodiments of this disclosure.

FIG. 33 illustrates a flowchart for timing alignment at a sync source BS according to various embodiments of this disclosure. Flowchart 3300 can be implemented in a BS, such as BS 200 in FIG. 2.

Flowchart 3300 begins at operation 3302 by receiving a preamble signal from a sync slave BS. In operation 3304, a propagation delay is estimated from the sync slave BS. In operation 3306, the propagation delay information is sent to the sync slave BS. The propagation delay information can be used by the sync slave BS to compute timing delay information.

In operation 3308, a determination is made as to whether an acknowledgement is received from the sync slave BS. If an acknowledgment is not received from the sync slave BS, then flowchart 3300 proceeds from operation 3308 to operation 3302. However, if an acknowledgment is received from the sync slave BS, then the flowchart terminates.

UE Timing Adjustment Indication During Serving Cell Timing Update

As discussed earlier in the disclosure, BSs in a shared spectrum network may need to change their coarse frame timing, for example, following the centralized or distributed synchronization source update procedures. When this occurs, UEs may lose synchronization to their serving BS and may have to perform the initial attach procedure again to re-establish communication with the serving BS, potentially leading to interruption of service.

Figure 34:
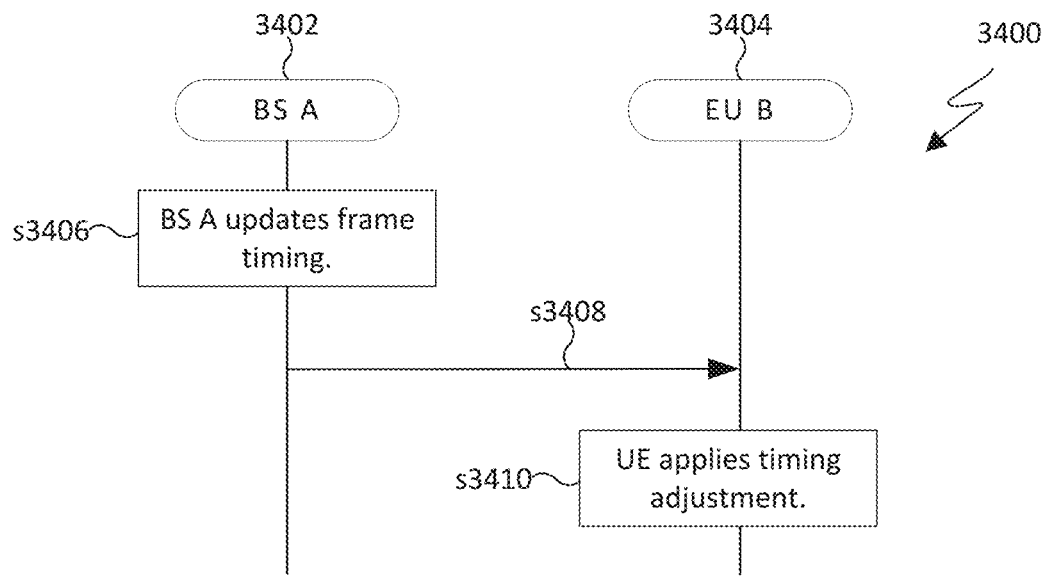
FIG. 34 illustrates a signal flow diagram for a UE timing adjustment update procedure according to various embodiments of this disclosure.

FIG. 34 illustrates a signal flow diagram for a UE timing adjustment update procedure according to various embodiments of this disclosure. BS A 3402 is a BS in a shared spectrum network, such as network 400 in FIG. 4 or network 600a in FIG. 6A. In addition, BS A 3402 is a serving BS to UE 3404.

In s3406, BS A 3402 updates its frame timing. To notify UE 3404 of a pending change to the timing of BS A 3402, the BS A 3402 sends a UE timing adjustment message in s3408. The timing adjustment message can include the timing offset to be applied, represented in units of time (which may be encoded in some standardized format such as UTC), number of samples, or some number of symbols (e.g. OFDM symbols) or time slots. The UE timing adjustment may also include an indication of when the timing adjustment should be applied, e.g. some frame, subframe, slot, symbol or sample index in the future, which may be represented as an absolute time/index or relative offset time/index. The UE timing adjustment may be contained in a Radio Resource Control (RRC) message or similar control message as in LTE. In s3410, the UE applies the timing adjustment accordingly.

Dedicated Synchronization Source Radio Node

Figure 35:
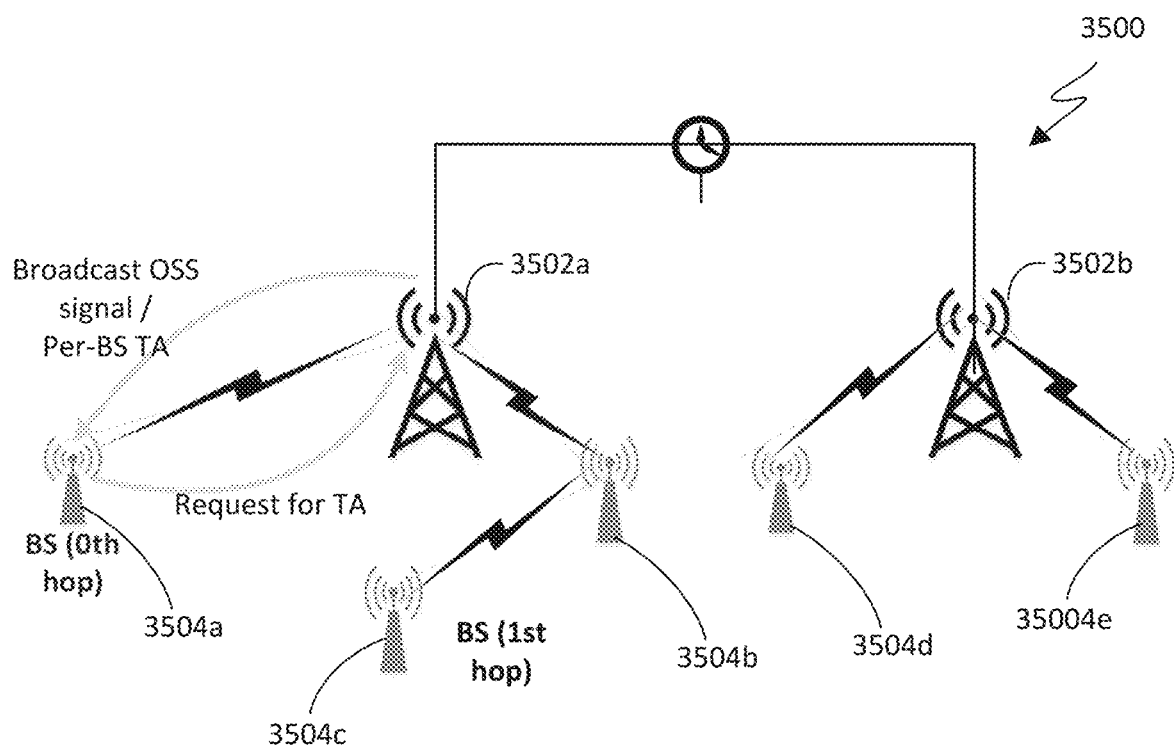
FIG. 35 illustrates an architecture for a dedicated synchronization source according to various embodiments of this disclosure.

As an alternative embodiment to the inter-BS, OTA synchronization methods for shared spectrum networks previously disclosed, a system of dedicated synchronization source nodes is provided in FIG. 35.

In particular, FIG. 35 illustrates an architecture for a dedicated synchronization source according to various embodiments of this disclosure. System 3500 can be included in a shared spectrum network, such as network 400 in FIG. 4 or network 600a in FIG. 6A.

System 3500 includes dedicated synchronization sources (DSSs) 3502a and 3502b, which are radio devices that transmit OSS for the purpose of providing synchronization to one or more base stations, such as BS 3504a, 3504b, 3504c, 3504d, and 3504e, which may belong to multiple MNO networks. DSS nodes 3502 may broadcast OSS over a large geographic area. Multiple DSSs may be deployed and may share a common absolute reference timing, for example provided by the GPS or backhaul PTP system. A DSS may transmit an OSS in a dedicated physical channel reserved for this purpose or may transmit in physical channel resources used for communications by BSs.

The network of DSS nodes 3502 may also be augmented by OTA synchronization between BSs, as shown in FIG. 35. For example, the DSS may be considered a root ($0^{th}$-stratum) synchronization source, whereas BSs synchronized to the DSS may operate as secondary ($1^{st}$-stratum) synchronization sources. In FIG. 35, BS 3504a, 35304b, 3504d, and 3504e can be treated as $1^{st}$-stratum sync sources. BSs synchronized to $1^{st}$-stratum may operate as $2^{nd}$-stratum sources. In this example in FIG. 35, BS 3504c is a $2^{nd}$-stratum source. Inter-BS synchronization may still be necessary, in some cases, where the OSS transmitted by a DSS cannot be received, or is not received at high enough power, by a BS. A DSS may also have an uplink channel for feedback from the BSs, for example for requesting timing advance information, which can be a dedicated physical channel or physical channel shared by BSs.

Figure 36:
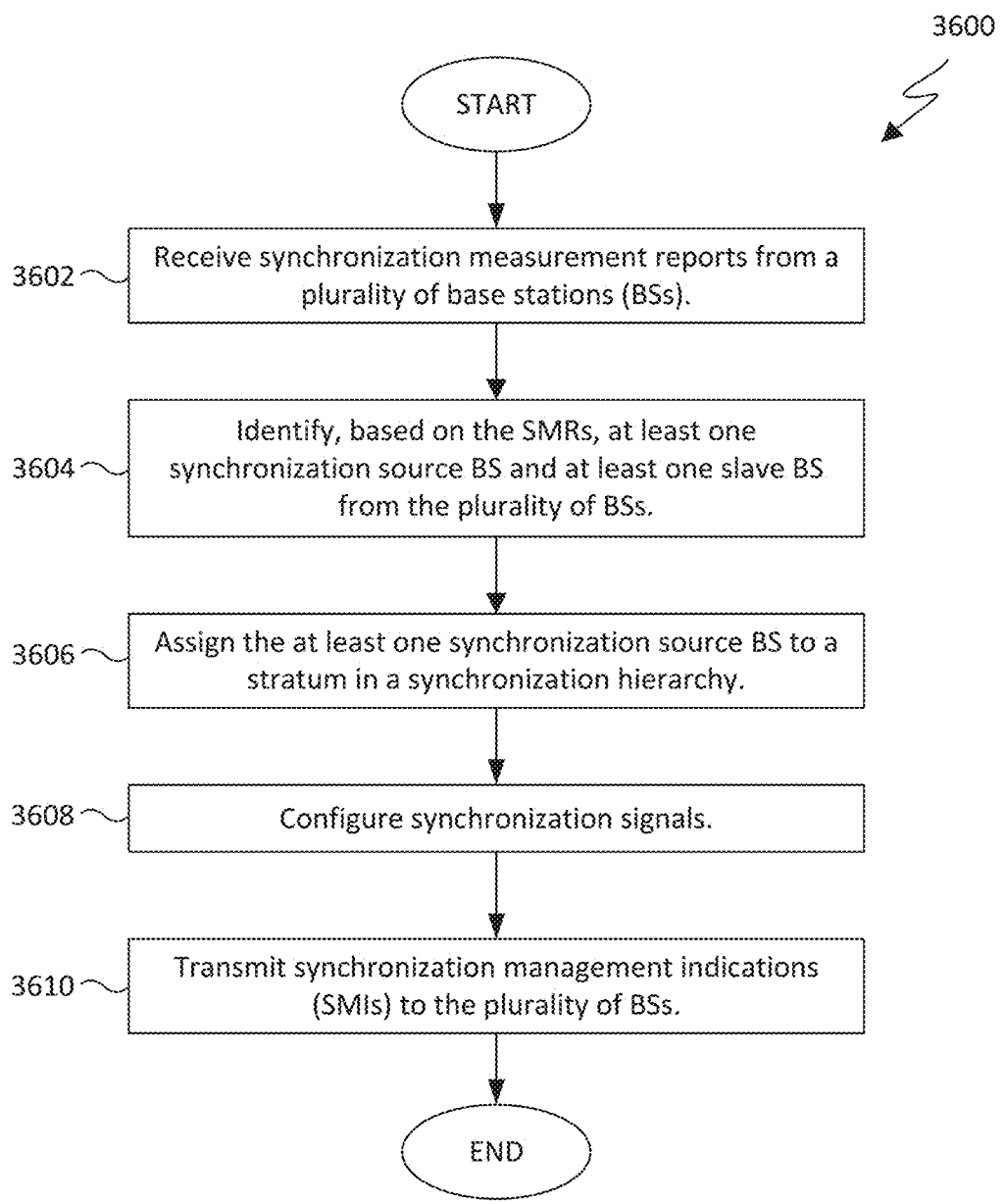
FIG. 36 illustrates a flowchart of a process for synchronization of shared spectrum networks according to various embodiments of this disclosure.

FIG. 36 illustrates a flowchart of a process for synchronization of shared spectrum networks according to various embodiments of this disclosure. Operations of flowchart 3600 can be implemented in a shared spectrum manager, such as SSM 406 in FIG. 4.

In operation 3602, synchronization measurement reports (SMRs) are received from a plurality of BSs.

In operation 3604, at least one synchronization source BS and at least one slave BS is identified from the plurality of BSs, based on the SMRs. In one embodiment, transmission timing of the at least one slave BS is based on transmission timing of the at least one synchronization source BS.

In an embodiment, identifying the at least one synchronization source BS includes identifying interference relationships among the plurality of BSs, identifying one or more connected sets of BSs based on the identified interference relationships, identifying at least one synchronization source BS for each of the one or more connected sets of BSs, and identifying a slave BS in at least one of the one or more connected sets of BSs. In this embodiment, BSs in a connected set of BSs do not interfere with BSs in another connected set of BSs.

In operation 3606, the at least one synchronization source BS is assigned to a stratum in a synchronization hierarchy. A synchronization source BS assigned to an n=0 stratum provides a reference frame timing for the plurality of BSs. A synchronization source BS assigned to an n>0 stratum derives frame timing from another synchronization source BS assigned to an n−1 stratum. In either event, the at least one synchronization source BS transmits over-the-air synchronization signals (OSS) to at least one of another synchronization source BS assigned to an n+1 stratum or one of the at least one slave BS.

In an embodiment, the synchronization source BS assigned to the n=0 stratum transmits a first OSS in a first frame and the synchronization source BS assigned to the n>0 stratum transmits a second OSS in a second frame that is different than the first frame. For example, each of the at least one synchronization source BSs transmits respective OSSs in a frame number (L*n+k), where L is a supported level of synchronization source BSs in the synchronization hierarchy, n is an integer, and k is a frame offset based on the assigned stratum.

In another embodiment, the synchronization source BS assigned to the n=0 stratum transmits a first OSS in a first time gap in a frame and the synchronization source BS assigned to the n>0 stratum transmits a second OSS in a second time gap in the frame. The first OSS and the second OSS include a respective timing offset based on a respective stratum, and a frame timing for a recipient of the first OSS or the second OSS is derived based on the respective timing offset. If a supported level of synchronization source BSs changes, a number of time gaps also changes based on the changes of the supported level of synchronization source BSs.

In operation 3608, synchronization signals are configured and in operation 3610 synchronization management indications (SMIs) are transmitted to the plurality of BSs. The SMIs include (i) the configured synchronization signals, (ii) the assigned stratum, and (iii) synchronization source/slave assignments.

In some embodiments, receiving the SMRs includes in operation 3602 includes receiving an SMR indicating unavailability of a BS in the plurality of BSs. In these embodiments, operation 3602 can also include determining interference relationships among remaining BSs in the plurality of BSs based on the unavailability of the BS. Thereafter, updated SMIs can be transmitted to one or more BSs in the remaining BSs based on the determined interference relationships. The updated SMIs include updated synchronization source/slave assignments.

Figure 37:
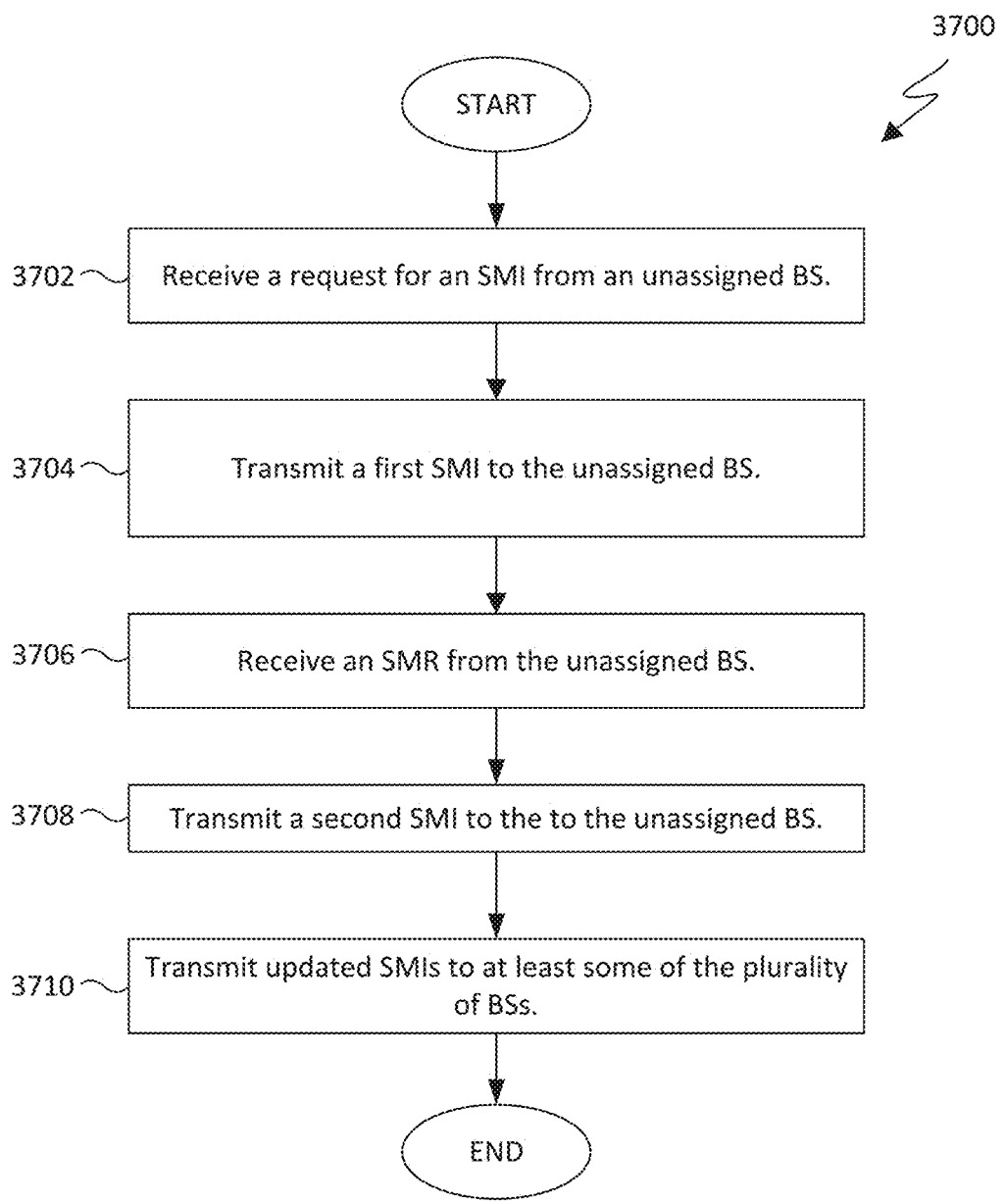
FIG. 37 illustrates a flowchart of a process for managing shared spectrum networks having an unassigned BS according to various embodiments of this disclosure.

In some embodiments, when the plurality of BS includes an unassigned BS, such as when a BS newly added to a system or then a BS is turned back on after PNO event, flowchart 3600 can include the additional operations described in FIG. 37 that follows.

FIG. 37 illustrates a flowchart of a process for managing shared spectrum networks having an unassigned BS according to various embodiments of this disclosure. Operations of flowchart 3700 can be implemented in a shared spectrum manager, such as SSM 406 in FIG. 4.

In operation 3702, a request for an SMI is received from the unassigned BS. In operation 3704, a first SMI is transmitted to the unassigned BS. The first SMI includes neighbor discovery assistance. In operation 3706, an SMR is received from the unassigned BS. The SMR includes a list of discovered neighbors and interference information. Thereafter, a second SMI is transmitted to the unassigned BS in operation 3708. The second SMI includes at least one of a stratum assignment or a synchronization source/slave assignment. In operation 3710 updated SMIs are transmitted to at least some of the plurality of BSs based on the stratum assignment or the synchronization source/slave assignment for the unassigned BS.

Although this disclosure has been described with an exemplary embodiment, various changes and modifications may be suggested to one skilled in the art. It is intended that this disclosure encompass such changes and modifications as fall within the scope of the appended claims.

What is claimed is:

1. An electronic device for managing a shared spectrum among a plurality of base stations (BSs), the electronic device comprising:
  memory comprising instructions for managing the shared spectrum; and
  a processor operably connected to the memory, the processor configured to execute the instructions to cause the electronic device to:
    receive synchronization measurement reports (SMRs) from the plurality of BSs;
    identify, based on the SMRs, at least one synchronization source BS and at least one slave BS from the plurality of BSs, wherein transmission timing of the at least one slave BS is based on transmission timing of the at least one synchronization source BS;
    assign the at least one synchronization source BS to a stratum in a synchronization hierarchy, wherein:
      a synchronization source BS assigned to an n=0 stratum provides a reference frame timing for the plurality of BSs, and
      a synchronization source BS assigned to an n>0 stratum derives frame timing from another synchronization source BS assigned to an n−1 stratum;

configure synchronization signals; and transmit synchronization management indications (SMIs) to the plurality of BSs, wherein the SMIs include (i) the configured synchronization signals, (ii) the assigned stratum, and (iii) synchronization source/slave assignments.

2. The electronic device of claim 1, wherein:

the at least one synchronization source BS transmits over-the-air synchronization signals (OSS) to at least one of another synchronization source BS assigned to an n+1 stratum or one of the at least one slave BS, and when the at least one synchronization source BS includes the synchronization source BS assigned to the n=0 stratum and the synchronization source BS assigned to the n>0 stratum, the synchronization source BS assigned to the n=0 stratum transmits a first OSS in a first frame and the synchronization source BS assigned to the n>0 stratum transmits a second OSS in a second frame that is different than the first frame.

3. The electronic device of claim 2, wherein each of the at least one synchronization source BSs transmits respective OSSs in a frame number (L*n+k), where L is a supported level of synchronization source BSs in the synchronization hierarchy, n is an integer, and k is a frame offset based on the assigned stratum.

4. The electronic device of claim 1, wherein:

the at least one synchronization source BS transmits over-the-air synchronization signals (OSS) to at least one of another synchronization source BS assigned to an n+1 stratum or one of the at least one slave BS, and when the at least one synchronization source BS includes the synchronization source BS assigned to the n=0 stratum and the synchronization source BS assigned to the n>0 stratum, the synchronization source BS assigned to the n=0 stratum transmits a first OSS in a first time gap in a frame and the synchronization source BS assigned to the n>0 stratum transmits a second OSS in a second time gap in the frame.

5. The electronic device of claim 4, wherein:

the first OSS and the second OSS include a respective timing offset based on a respective stratum, and a frame timing for a recipient of the first OSS or the second OSS is derived based on the respective timing offset.

6. The electronic device of claim 4, wherein the processor is configured to execute the instructions to further cause the electronic device to:

determine that a supported level of synchronization source BSs changes, and change a number of time gaps based on the determined changes.

7. The electronic device of claim 1, wherein to identify the at least one synchronization source BS and the at least one slave BS, the processor is configured to execute the instructions to further cause the electronic device to:

identify interference relationships among the plurality of BSs;

identify one or more connected sets of BSs based on the identified interference relationships, wherein BSs in a connected set of BSs do not interfere with BSs in another connected set of BSs;

identify at least one synchronization source BS for each of the one or more connected sets of BSs; and identify a slave BS in at least one of the one or more connected sets of BSs.

8. The electronic device of claim 1, wherein the plurality of BSs includes an unassigned BS, the processor is configured to execute the instructions to further cause the electronic device to:

receive a request for a first SMI from the unassigned BS;

transmit the first SMI to the unassigned BS, wherein the first SMI includes neighbor discovery assistance;

receive an SMR from the unassigned BS, wherein the SMR includes a list of discovered neighbors and interference information;

transmit a second SMI to the unassigned BS that includes a stratum assignment or a synchronization source/slave assignment for the unassigned BS; and transmit updated SMIs to at least some of the plurality of BSs based on the stratum assignment or the synchronization source/slave assignment for the unassigned BS.

9. The electronic device of claim 1, wherein to receive SMRs including an SMR indicating unavailability of a BS in the plurality of BS, the processor is configured to execute the instructions to further cause the electronic device to:

determine interference relationships among remaining BSs in the plurality of BSs based on the unavailability of the BS; and transmit updated SMIs to one or more BSs in the remaining BSs based on the determined interference relationships, wherein the updated SMIs include updated synchronization source/slave assignments.

10. A method for managing a shared spectrum among a plurality of base stations (BSs), the method comprising:

receiving synchronization measurement reports (SMRs) from the plurality of BSs;

identifying, based on the SMRs, at least one synchronization source BS and at least one slave BS from the plurality of BSs, wherein transmission timing of the at least one slave BS is based on transmission timing of the at least one synchronization source BS;

assigning the at least one synchronization source BS to a stratum in a synchronization hierarchy, wherein:

a synchronization source BS assigned to an n=0 stratum provides a reference frame timing for the plurality of BSs, and a synchronization source BS assigned to an n>0 stratum derives frame timing from another synchronization source BS assigned to an n−1 stratum;

configuring synchronization signals; and transmitting synchronization management indications (SMIs) to the plurality of BSs, wherein the SMIs include (i) the configured synchronization signals, (ii) the assigned stratum, and (iii) synchronization source/ slave assignments.

11. The method of claim 10, wherein:

the at least one synchronization source BS transmits over-the-air synchronization signals (OSS) to at least one of another synchronization source BS assigned to an n+1 stratum or one of the at least one slave BS, and based on the at least one synchronization source BS including the synchronization source BS assigned to the n=0 stratum and the synchronization source BS assigned to the n>0 stratum, the synchronization source BS assigned to the n=0 stratum transmits a first OSS in a first frame and the synchronization source BS assigned to the n>0 stratum transmits a second OSS in a second frame that is different than the first frame.

12. The method of claim 11, wherein each of the at least one synchronization source BSs transmits respective OSSs in a frame number (L*n+k), where L is a supported level of synchronization source BSs in the synchronization hierarchy, n is an integer, and k is a frame offset based on the assigned stratum.

13. The method of claim 10, wherein:
the at least one synchronization source BS transmits over-the-air synchronization signals (OSS) to at least one of another synchronization source BS assigned to an n+1 stratum or one of the at least one slave BS, and
based on the at least one synchronization source BS includes the synchronization source BS assigned to the n=0 stratum and the synchronization source BS assigned to the n>0 stratum, the synchronization source BS assigned to the n=0 stratum transmits a first OSS in a first time gap in a frame and the synchronization source BS assigned to the n>0 stratum transmits a second OSS in a second time gap in the frame.

14. The method of claim 13, wherein:
the first OSS and the second OSS include a respective timing offset based on a respective stratum, and
a frame timing for a recipient of the first OSS or the second OSS is derived based on the respective timing offset.

15. The method of claim 13, further comprising:
determining that a supported level of synchronization source BSs changes, and
changing a number of time gaps based on the determined changes.

16. The method of claim 10, wherein identifying the at least one synchronization source BS and the at least one slave BS comprises:
identifying interference relationships among the plurality of BSs;
identifying one or more connected sets of BSs based on the identified interference relationships, wherein BSs in a connected set of BSs do not interfere with BSs in another connected set of BSs;
identifying at least one synchronization source BS for each of the one or more connected sets of BSs; and
identifying a slave BS in at least one of the one or more connected sets of BSs.

17. The method of claim 10, wherein the plurality of BSs includes an unassigned BS, the method further comprising:
receiving a request for a first SMI from the unassigned BS;
transmitting the first SMI to the unassigned BS, wherein the first SMI includes neighbor discovery assistance;
receiving an SMR from the unassigned BS, wherein the SMR includes a list of discovered neighbors and interference information;
transmitting a second SMI to the unassigned BS that includes a stratum assignment or a synchronization source/slave assignment for the unassigned BS; and
transmitting updated SMIs to at least some of the plurality of BSs based on the stratum assignment or the synchronization source/slave assignment for the unassigned BS.

18. The method of claim 10, wherein receiving the SMRs includes receiving an SMR indicating unavailability of a BS in the plurality of BSs, the method further comprising:
determining interference relationships among remaining BSs in the plurality of BSs based on the unavailability of the BS; and
transmitting updated SMIs to one or more BSs in the remaining BSs based on the determined interference relationships, wherein the updated SMIs include updated synchronization source/slave assignments.

19. A base station (BS) comprising:
a processor, the processor configured to generate a synchronization measurement report (SMR); and
a transceiver operably connected to the processor, the transceiver configured to:
transmit the SMR,
receive a synchronization management signals (SMI), wherein the SMI includes at least one of (i) configured synchronization signals, (ii) an assigned stratum n of a synchronization hierarchy, or (iii) synchronization source/slave assignments, and
responsive to the transceiver receiving the assigned stratum n, transmit a set of over-the-air synchronization signals (OSS) to at least one of another synchronization source BS assigned to an n+1 stratum in the synchronization hierarchy or at least one slave BS, wherein:
if the BS is assigned to an n=0 stratum, the BS transmits the set of OSS without reference to frame timing from another synchronization source BS, and
if the BS is assigned to an n>0 stratum, the BS transmits the set of OSS based on frame timing derived from another synchronization source BS assigned to an n−1 stratum.

20. The BS of claim 19, wherein:
the BS transmits the set of OSS in a frame number (L*n+k), where L is a supported level of synchronization source BSs in the synchronization hierarchy, n is an integer, and k is a frame offset based on the assigned stratum; or
the BS transmits the set of OSS in one of a first time gap in a frame if the BS is assigned to the n=0 stratum, or in a second time gap in the frame if the BS is assigned to the n>0 stratum.

* * * * *